(12) United States Patent
Kuriki et al.

(10) Patent No.: US 10,388,467 B2
(45) Date of Patent: Aug. 20, 2019

(54) ELECTRODE FOR POWER STORAGE DEVICE, POWER STORAGE DEVICE, AND MANUFACTURING METHOD OF ELECTRODE FOR POWER STORAGE DEVICE

(71) Applicant: SEMICONDUCTOR ENERGY LABORATORY CO., LTD., Atsugi-shi, Kanagawa-ken (JP)

(72) Inventors: Kazutaka Kuriki, Kanagawa (JP); Ryota Tajima, Kanagawa (JP); Nobuhiro Inoue, Kanagawa (JP); Junpei Momo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 967 days.

(21) Appl. No.: 14/069,408

(22) Filed: Nov. 1, 2013

(65) Prior Publication Data
US 2014/0127567 A1    May 8, 2014

(30) Foreign Application Priority Data

Nov. 7, 2012    (JP) .................................. 2012-245847

(51) Int. Cl.
*H01M 4/36*    (2006.01)
*H01G 11/42*    (2013.01)
(Continued)

(52) U.S. Cl.
CPC .............. *H01G 11/42* (2013.01); *H01G 11/32* (2013.01); *H01M 4/1393* (2013.01);
(Continued)

(58) Field of Classification Search
CPC ..... H01G 11/32; H01G 11/42; H01M 4/1393; H01M 4/366; H01M 4/587
(Continued)

(56) References Cited

U.S. PATENT DOCUMENTS 5,015,547 A    5/1991   Koshiba et al.
5,338,625 A    8/1994   Bates et al.
(Continued)

FOREIGN PATENT DOCUMENTS

CN    101331630 A    12/2008
CN    101331630 B    1/2011
(Continued)

OTHER PUBLICATIONS

English translation of JP 2010015895 A, Sueki, Jan. 2010, Japan.*
(Continued)

*Primary Examiner* — Cynthia H Kelly
*Assistant Examiner* — Rashid A Alam
(74) *Attorney, Agent, or Firm* — Nixon Peabody LLP; Jeffrey L. Costellia

(57) ABSTRACT

To improve the long-term cycle performance of a lithium-ion battery or a lithium-ion capacitor by minimizing the decomposition reaction of an electrolytic solution and the like as a side reaction of charge and discharge in the repeated charge and discharge cycles of the lithium-ion battery or the lithium-ion capacitor. A current collector and an active material layer over the current collector are included in an electrode for a power storage device. The active material layer includes a plurality of active material particles and silicon oxide. The surface of one of the active material particles has a region that is in contact with one of the other active material particles. The surface of the active material particle except the region is partly or entirely covered with the silicon oxide.

14 Claims, 16 Drawing Sheets

(51) Int. Cl.
*H01M 4/1393* (2010.01)
*H01G 11/32* (2013.01)
*H01M 4/587* (2010.01)

(52) U.S. Cl.
CPC ............ *H01M 4/587* (2013.01); *H01M 4/366* (2013.01); *Y02E 60/13* (2013.01)

(58) Field of Classification Search
USPC ........................................................ 429/211
See application file for complete search history.

(56) References Cited

U.S. PATENT DOCUMENTS

| | | | |
|---|---|---|---|
| 6,063,142 A | 5/2000 | Kawakami et al. | |
| 6,218,050 B1 | 4/2001 | Yoon et al. | |
| 6,333,128 B1 | 12/2001 | Sunagawa et al. | |
| 6,387,564 B1 * | 5/2002 | Yamashita | H01M 2/164 29/623.3 |
| 6,641,955 B1 | 11/2003 | Matsubara et al. | |
| 6,685,804 B1 | 2/2004 | Ikeda et al. | |
| 6,828,063 B2 | 12/2004 | Park et al. | |
| 6,887,511 B1 | 5/2005 | Shima et al. | |
| 7,179,561 B2 | 2/2007 | Niu et al. | |
| 7,192,673 B1 | 3/2007 | Ikeda et al. | |
| 7,235,330 B1 | 6/2007 | Fujimoto et al. | |
| 7,241,533 B1 | 7/2007 | Ikeda et al. | |
| 7,285,359 B2 | 10/2007 | Yamamoto et al. | |
| 7,410,728 B1 | 8/2008 | Fujimoto et al. | |
| 7,745,047 B2 | 6/2010 | Zhamu et al. | |
| 7,781,101 B2 | 8/2010 | Okazaki et al. | |
| 7,794,881 B1 | 9/2010 | Fujimoto et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,080,337 B2 | 12/2011 | Higuchi et al. | |
| 8,278,011 B2 | 10/2012 | Zhu et al. | |
| 8,293,409 B2 | 10/2012 | Suzuki | |
| 8,388,922 B2 | 3/2013 | Sotowa et al. | |
| 8,399,132 B2 | 3/2013 | Park | |
| 8,637,177 B2 | 1/2014 | Nomura et al. | |
| 8,932,761 B2 | 1/2015 | Yamaguchi et al. | |
| 9,166,221 B2 | 10/2015 | Yamaguchi et al. | |
| 9,431,650 B2 | 8/2016 | Yamaguchi et al. | |
| 2002/0168574 A1 | 11/2002 | Ahn et al. | |
| 2004/0101761 A1 | 5/2004 | Park et al. | |
| 2004/0126659 A1 | 7/2004 | Graetz et al. | |
| 2005/0008935 A1 | 1/2005 | Skotheim et al. | |
| 2006/0040182 A1 | 2/2006 | Kawakami et al. | |
| 2007/0007239 A1 | 1/2007 | Lee et al. | |
| 2007/0092797 A1 | 4/2007 | Konishiike et al. | |
| 2007/0275302 A1 | 11/2007 | Sotowa et al. | |
| 2007/0287070 A1 * | 12/2007 | Okumura | H01M 4/131 429/317 |
| 2008/0003503 A1 | 1/2008 | Kawakami et al. | |
| 2008/0254296 A1 | 10/2008 | Handa et al. | |
| 2009/0029245 A1 | 1/2009 | Ibaragi et al. | |
| 2009/0029264 A1 | 1/2009 | Nakazawa et al. | |
| 2009/0092892 A1 * | 4/2009 | Yamaguchi | H01M 4/13 429/125 |
| 2009/0136847 A1 | 5/2009 | Jeong et al. | |
| 2009/0169996 A1 | 7/2009 | Zhamu et al. | |
| 2009/0214958 A1 | 8/2009 | Park | |
| 2009/0286157 A1 * | 11/2009 | Chen | H01M 4/0416 429/209 |
| 2009/0311608 A1 | 12/2009 | Hirose et al. | |
| 2010/0143798 A1 | 6/2010 | Zhamu et al. | |
| 2010/0176337 A1 | 7/2010 | Zhamu et al. | |
| 2010/0209784 A1 | 8/2010 | Yamazaki et al. | |
| 2010/0248034 A1 | 9/2010 | Oki et al. | |
| 2010/0310908 A1 | 12/2010 | Zhang et al. | |
| 2010/0330421 A1 | 12/2010 | Cui et al. | |
| 2011/0012067 A1 | 1/2011 | Kay | |
| 2011/0052997 A1 | 3/2011 | Kim et al. | |
| 2011/0084229 A1 | 4/2011 | Kawakami et al. | |
| 2011/0097627 A1 | 4/2011 | Watanabe et al. | |
| 2011/0111303 A1 | 5/2011 | Kung et al. | |
| 2011/0121240 A1 | 5/2011 | Amine et al. | |
| 2011/0151290 A1 | 6/2011 | Cui et al. | |
| 2011/0159372 A1 | 6/2011 | Zhamu et al. | |
| 2011/0177396 A1 | 7/2011 | Moriwaka et al. | |
| 2011/0229795 A1 | 9/2011 | Niu et al. | |
| 2011/0250506 A1 | 10/2011 | Koshina | |
| 2011/0250509 A1 | 10/2011 | Yamaguchi et al. | |
| 2011/0266654 A1 | 11/2011 | Kuriki et al. | |
| 2011/0291240 A1 | 12/2011 | Yamazaki | |
| 2011/0318631 A1 * | 12/2011 | Nomura | H01G 9/02 429/144 |
| 2012/0045692 A1 | 2/2012 | Takemura et al. | |
| 2012/0141866 A1 | 6/2012 | Kuriki et al. | |
| 2012/0328956 A1 | 12/2012 | Oguni et al. | |
| 2013/0052528 A1 | 2/2013 | Kuriki et al. | |
| 2013/0164619 A1 | 6/2013 | Yamakaji et al. | |
| 2013/0230772 A1 | 9/2013 | Noda et al. | |
| 2013/0266858 A1 | 10/2013 | Inoue et al. | |
| 2013/0323585 A1 | 12/2013 | Inoue et al. | |
| 2014/0087251 A1 | 3/2014 | Takahashi et al. | |
| 2014/0099554 A1 | 4/2014 | Inoue et al. | |
| 2014/0127566 A1 | 5/2014 | Kuriki et al. | |
| 2016/0308201 A1 | 10/2016 | Yamaguchi et al. | |

FOREIGN PATENT DOCUMENTS

| | | | |
|---|---|---|---|
| CN | 102341947 A | 2/2012 | |
| JP | 04-080331 A | 3/1992 | |
| JP | 11-060385 A | 3/1999 | |
| JP | 11-096993 | 4/1999 | |
| JP | 2001-210315 A | 8/2001 | |
| JP | 2004-014381 | 1/2004 | |
| JP | 2004-281317 A | 10/2004 | |
| JP | 2004-303593 A | 10/2004 | |
| JP | 2005-222933 A | 8/2005 | |
| JP | 2005-272983 A | 10/2005 | |
| JP | 2005-302510 | 10/2005 | |
| JP | 2005-332769 | 12/2005 | |
| JP | 2005-347147 A | 12/2005 | |
| JP | 2006-059641 | 3/2006 | |
| JP | 2006-156008 A | 6/2006 | |
| JP | 2007-005201 A | 11/2007 | |
| JP | 2008-004534 A | 1/2008 | |
| JP | 2008-016195 A | 1/2008 | |
| JP | 2009-164014 A | 7/2009 | |
| JP | 2009-193686 A | 8/2009 | |
| JP | 2009-245926 A | 10/2009 | |
| JP | 2010015895 A * | 1/2010 | ............ H01M 4/133 |
| JP | 2010-123283 A | 6/2010 | |
| JP | 2010-244847 | 10/2010 | |
| JP | 2010-250968 A | 11/2010 | |
| JP | 2011-159534 A | 8/2011 | |
| WO | WO-2005/067081 | 7/2005 | |
| WO | WO-2006/062947 | 6/2006 | |
| WO | WO-2007/061945 | 5/2007 | |
| WO | WO-2009/127901 | 10/2009 | |
| WO | WO-2009/144600 | 12/2009 | |
| WO | WO-2010/001993 | 1/2010 | |
| WO | WO-2010/125467 | 11/2010 | |

OTHER PUBLICATIONS

Ogumi.Z et al., "6.1.6 Influence of Electrolytic Solution and Surface Film Formation,", Lithium secondary battery, Mar. 20, 2008, pp. 116-124, Ohmsha, Ltd., Japan.

Inoue.N et al., "Improvement of cycle performance of lithium ion batteries at elevated temperature of 60° C. using graphite coated with metal oxide,", 222nd ECS Meeting Abstract, Oct. 7, 2012, p. 654, ECS.

International Search Report (Application No. PCT/JP2013/079658) dated Feb. 4, 2014.

Written Opinion (Application No. PCT/JP2013/079658) dated Feb. 4, 2014.

(56) References Cited

OTHER PUBLICATIONS

Taiwanese Office Action (Application No. 102139948) dated Jan. 25, 2017.
Chinese Office Action (Application No. 201380058332.9) dated Sep. 28, 2016.
Zhou.X et al., "Graphene modified LiFePO4 cathode materials for high power lithium ion batteries", J. Mater. Chem. (Journal of Materials Chemistry), 2011, vol. 21, pp. 3353-3358.
Kohno.H et al., "Silicon Nanoneedles Grown by a Simple Thermal Treatment Using Metal-Sulfur Catalysts", Jpn. J. Appl. Phys. (Japanese Journal of Applied Physics), Feb. 1, 2002, vol. 41, No. 2A, pp. 577-578.
Kamins.T et al., "Ti-catalyzed Si nanowires by chemical vapor deposition: Microscopy and growth mechanisms", J. Appl. Phys. (Journal of Applied Physics), Jan. 15, 2001, vol. 89, No. 2, pp. 1008-1016.
Cui.L et al., "Crystalline-Amorphous Core-Shell Silicon Nanowires for High Capacity and High Current Battery Electrodes", Nano Letters, 2009, vol. 9, No. 1, pp. 491-495.
Su.F et al., "Flexible and planar graphene conductive additives for lithium-ion batteries", J. Mater. Chem. (Journal of Materials Chemistry), 2010, vol. 20, pp. 9644-9650.
Yu.G et al., "Solution-Processed Graphene/MnO2 Nanostructured Textiles for High-Performance Electrochemical Capacitors", Nano Letters, 2011, vol. 11, No. 7, pp. 2905-2911.

\* cited by examiner

FIG. 1A
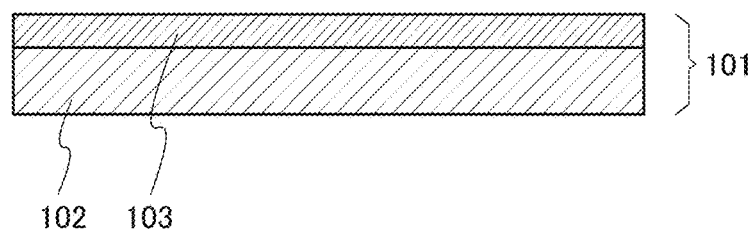
FIG. 1B
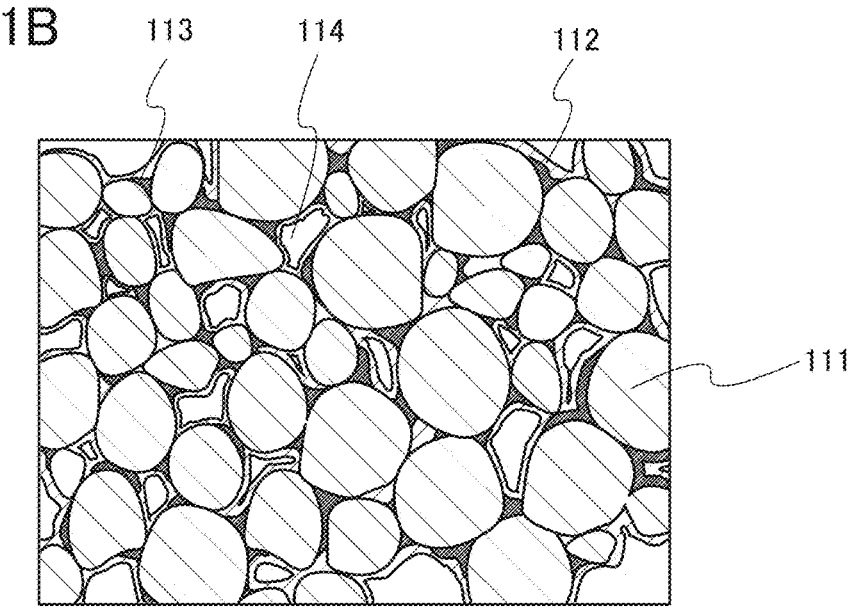
FIG. 1C1 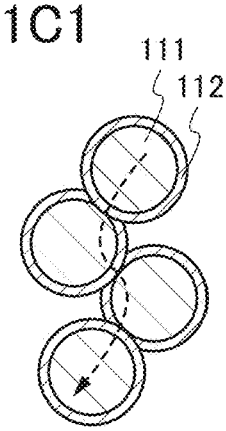
FIG. 1C2 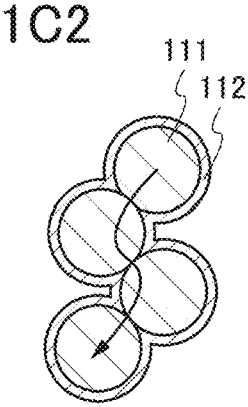

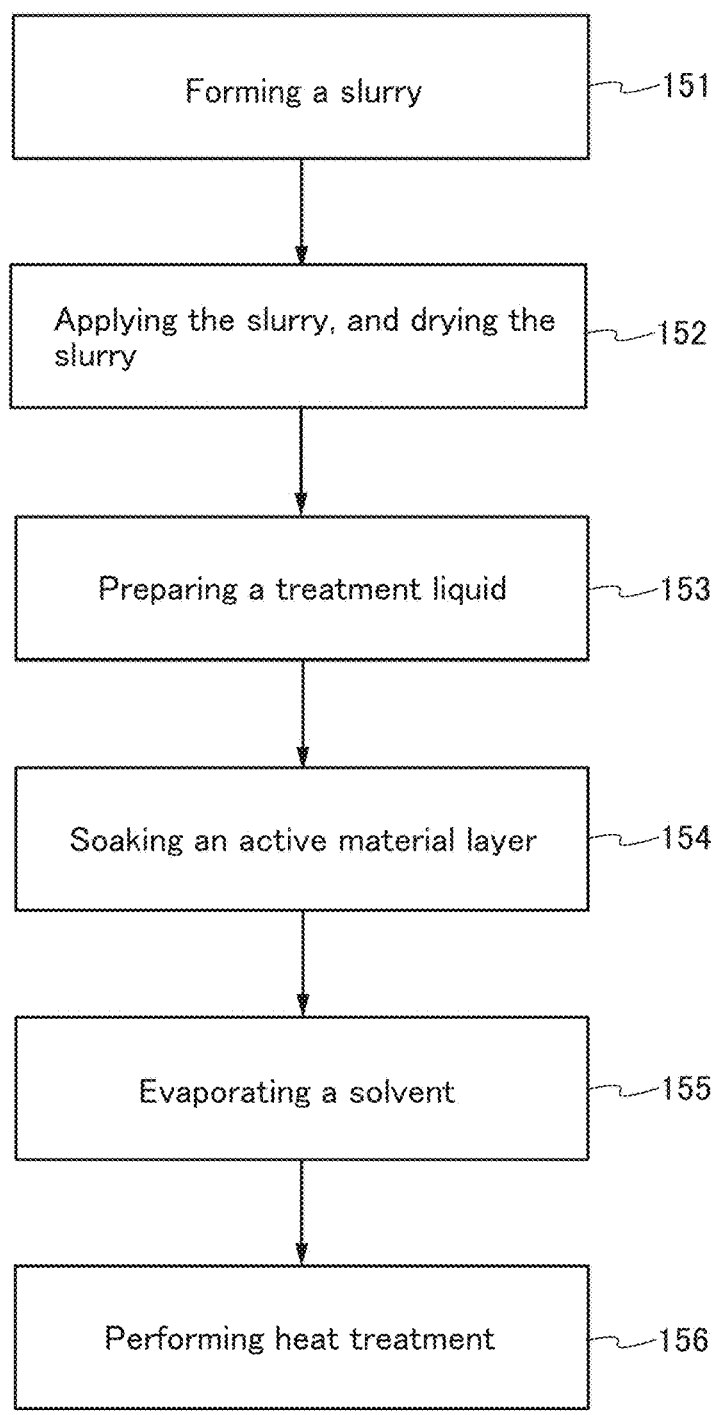

200

201
202
202

212 215 213

211

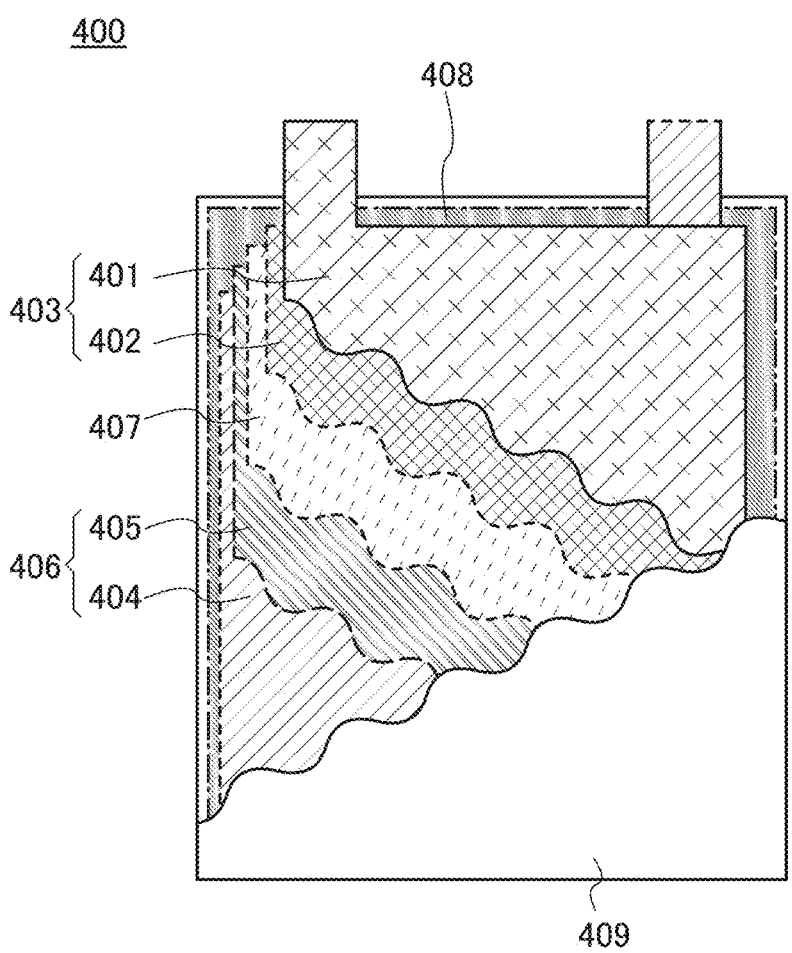

ELECTRODE FOR POWER STORAGE DEVICE, POWER STORAGE DEVICE, AND MANUFACTURING METHOD OF ELECTRODE FOR POWER STORAGE DEVICE

TECHNICAL FIELD

The present invention relates to a negative electrode for a power storage device and a power storage device.

BACKGROUND ART

In recent years, a variety of power storage devices, for example, nonaqueous secondary batteries such as lithium-ion secondary batteries (LIBs), lithium-ion capacitors (LICs), and air cells have been actively developed. In particular, demand for lithium-ion batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

A negative electrode for power storage devices such as lithium-ion batteries and the lithium-ion capacitors is a structure body including at least a current collector (hereinafter referred to as a negative electrode current collector) and an active material layer (hereinafter referred to as a negative electrode active material layer) provided over a surface of the negative electrode current collector. The negative electrode active material layer contains an active material (hereinafter referred to as a negative electrode active material) which can receive and release lithium ions serving as carrier ions, such as carbon or silicon.

At present, a negative electrode of a lithium-ion battery which contains a graphite-based carbon material is generally formed by mixing graphite as a negative electrode active material, acetylene black (AB) as a conductive additive, PVDF, which is a resin as a binder, to form a slurry, applying the slurry over a current collector, and drying the slurry, for example.

Such a negative electrode for a lithium-ion battery and a lithium-ion capacitor has an extremely low electrode potential and a high reducing ability. For this reason, an electrolytic solution containing an organic solvent is subjected to reductive decomposition. The range of potentials in which the electrolysis of an electrolytic solution does not occur is referred to as a potential window. A negative electrode originally needs to have an electrode potential in the potential window of an electrolytic solution. However, the negative electrode potentials of a lithium-ion battery and a lithium-ion capacitor are out of the potential windows of almost all electrolytic solutions. Actually, a decomposition product of an electrolytic solution forms a passivating film (also referred to as solid electrolyte interphase) on the surface of a negative electrode, and the passivating film inhibits further reductive decomposition. Consequently, lithium ions can be inserted into the negative electrode with the use of a low electrode potential below the potential window of an electrolytic solution (for example, see Non-Patent Document 1).

REFERENCE

[Non-Patent Document 1] Zempachi Ogumi, "Lithium Secondary Battery", Ohmsha, Ltd., the first impression of the first edition published on Mar. 20, 2008, pp. 116-118

DISCLOSURE OF INVENTION

A passivating film is a reductive decomposition product generated by reductive decomposition reaction of an electrolytic solution or a product of a reaction between a reductive decomposition product and an electrolytic solution. For example, in the case where a negative electrode active material is graphite, which has a layered structure, a passivating film is formed between layers in an edge surface of the graphite and on a surface (basal surface) of the graphite. When carrier ions are inserted into the graphite and thus the volume of the graphite increases, part of the passivating film is separated from the graphite and part of the negative electrode active material is exposed.

Although a generated passivating film kinetically inhibits the decomposition of an electrolytic solution, the thickness of the passivating film gradually increases on repeated charge and discharge. The passivating film having an increased thickness is susceptible to the volume expansion of a negative electrode active material, and part of the passivating film is easily separated.

Another passivating film is formed on a surface of the negative electrode active material which is exposed by the separation of the passivating film.

A passivating film of a conventional negative electrode is considered as being formed because of battery reaction in charging, and electric charge used for formation of the passivating film cannot be discharged. Thus, irreversible capacity resulting from the electric charge used for forming the passivating film reduces the initial discharge capacity of a lithium-ion battery. In addition, separation of the passivating film and formation of other passivating films on repeated charge and discharge further reduce the discharge capacity.

As the electrochemical decomposition of an electrolytic solution proceeds, the amount of lithium responsible for charge and discharge is decreased in accordance with the number of electrons used in the decomposition reaction of the electrolytic solution. Therefore, as charge and discharge are repeated and other passivating films are generated, the capacity of a lithium-ion battery is lost after a while. In addition, the higher the temperature is, the faster the electrochemical reaction proceeds. Thus, the capacity of a lithium-ion battery decreases more significantly as charge and discharge are repeated at high temperature.

Not only lithium-ion batteries but also power storage devices such as lithium-ion capacitors have the above problems.

In view of the above, an object of one embodiment of the present invention is to form a stable surface of an active material of a lithium-ion battery or a lithium-ion capacitor to minimize the electrochemical decomposition of an electrolytic solution and the like around an electrode.

Another object of one embodiment of the present invention is to improve the long-term cycle performance of a lithium-ion battery or a lithium-ion capacitor by minimizing the decomposition reaction of an electrolytic solution and the like as a side reaction of charge and discharge in the repeated charge and discharge cycles of the lithium-ion battery or the lithium-ion capacitor.

One embodiment of the present invention achieves at least one of the above objects.

One embodiment of the present invention provides an electrode for a power storage device that includes a current collector and an active material layer over the current collector. The active material layer includes a plurality of active material particles and either metal oxide or silicon oxide. The surface of one of the active material particles has a region that is in contact with one of the other active material particles. The surface of the active material particle except the region is partly or entirely covered with the metal oxide or the silicon oxide.

Another embodiment of the present invention provides a power storage device including the above electrode for a power storage device.

According to one embodiment of the present invention, an active material of a lithium-ion battery or a lithium-ion capacitor has a stable surface, which makes it possible to minimize the electrochemical decomposition of an electrolytic solution and the like around an electrode.

Further, according to one embodiment of the present invention, it is possible to minimize the decomposition reaction of an electrolytic solution and the like as a side reaction of charge and discharge in the repeated charge and discharge cycles of a power storage device such as a lithium-ion battery or a lithium-ion capacitor, and thus the long-term cycle performance of the lithium-ion battery or the lithium ion capacitor can be improved.

BRIEF DESCRIPTION OF DRAWINGS

In the accompanying drawings:

FIGS. 1A to 1C2 illustrate an electrode and a negative electrode active material provided with a metal oxide film;

FIG. 2 shows a method for forming an active material provided with a metal oxide film;

FIG. 6 illustrates a laminated lithium-ion battery;

BEST MODE FOR CARRYING OUT THE INVENTION

Figure 3A:
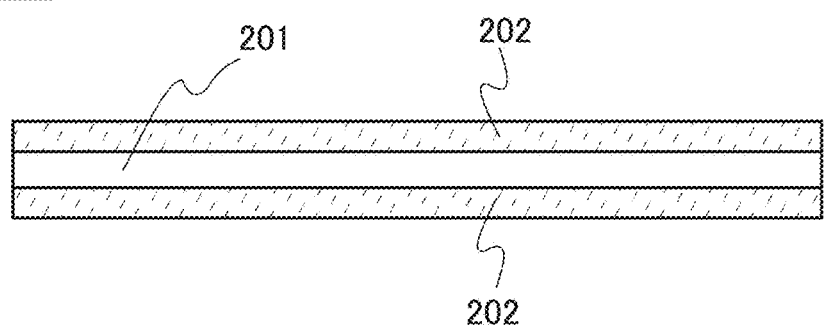
FIGS. 3A and 3B illustrate a negative electrode.

Hereinafter, embodiments and examples will be described with reference to drawings. However, the embodiments and examples can be implemented in many different modes, and it will be readily appreciated by those skilled in the art that modes and details thereof can be changed in various ways without departing from the spirit and scope of the present invention. Thus, the present invention should not be interpreted as being limited to the following descriptions of the embodiments and examples.

(Embodiment 1)

In this embodiment, an electrode for a power storage device of one embodiment of the present invention will be described with reference to FIGS. 1A to 1C2.

FIGS. 1A and 1B each illustrate an electrode for a power storage device of one embodiment of the present invention. FIG. 1A is a cross-sectional view of an electrode 101. In the schematic view of FIG. 1A, an active material layer 103 is formed over one surface of a current collector 102.

For the current collector 102, a highly conductive material such as a metal typified by stainless steel, gold, platinum, zinc, iron, copper, aluminum, or titanium, or an alloy thereof can be used. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector 102 can have a foil-like shape, a plate-like shape (sheet-like shape), a net-like shape, a punching-metal shape, an expanded-metal shape, or the like as appropriate. The current collector 102 preferably has a thickness of greater than or equal to 10 μm and less than or equal to 30 μm.

The active material layer 103 includes at least an active material, a film, and a binder. The active material layer 103 may further include a conductive additive.

In the case where the electrode 101 is a negative electrode, graphite, which is a carbon material generally used in the field of power storage, can be used as a negative electrode active material. Examples of graphite include low crystalline carbon such as soft carbon and hard carbon and high crystalline carbon such as natural graphite, kish graphite, pyrolytic graphite, mesophase pitch based carbon fiber, meso-carbon microbeads (MCMB), mesophase pitches, petroleum-based or coal-based coke, and the like. Alternatively, graphene as a carbon material, which will be specifically described later, may be used. Carbon black such as acetylene black (AB) can be used. Alternatively, a carbon material such as a carbon nanotube, graphene, or fullerene may be used.

The above carbon materials can each function as an active material and a conductive additive of a negative electrode. Thus, the active material layer 103 may include one or more of the above carbon materials. The carbon material can also function as a conductive additive of a positive electrode. Note that as the conductive additive, a carbon material with a large specific surface area is preferably used. The use of a carbon material with a large specific surface area as the conductive additive can increase contact points and the contact area of active materials.

For example, graphene has excellent electric characteristics of high conductivity and excellent physical characteristics such as sufficient flexibility and high mechanical strength. Thus, the use of graphene as the conductive additive can increase contact points and the contact area of active materials.

Graphene in this specification includes single-layer graphene and multilayer graphene including two to hundred layers. Single-layer graphene refers to a one-atom-thick sheet of carbon molecules having π bonds. Graphene oxide refers to a compound formed by oxidizing the graphene.

When graphene oxide is reduced to form graphene, oxygen contained in the graphene oxide is not entirely released and part of the oxygen remains in the graphene. When the graphene contains oxygen, the proportion of the oxygen, which is measured by XPS, is higher than or equal to 2 at. % and lower than or equal to 20 at. % of the whole graphene, preferably higher than or equal to 3 at. % and lower than or equal to 15 at. % of the whole graphene.

In the case where graphene is multilayer graphene including graphene obtained by reducing graphene oxide, the interlayer distance between graphenes is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes used for the power storage device of one embodiment of the present invention is longer than that in general graphite, carrier ions can easily transfer between the graphenes in multilayer graphene.

The degree of graphitization of a carbon material might influence the initial irreversible capacity of a power storage device. The degree of graphitization is expressed by a ratio $I_{1360}/I_{1580}$ (also referred to as an R value), which is the ratio of the peak intensity $I_{1360}$ (what is called a D band) when a Raman shift of the Raman spectrum observed using Raman spectroscopy is 1360 cm$^{-1}$ to the peak intensity $I_{1580}$ (what is called a G band) when a Raman shift is 1580 cm$^{-1}$. The smaller the R value, the higher the degree of graphitization. In other words, the smaller the R value, the higher the crystallinity.

When a carbon material with a low degree of graphitization is included in a negative electrode, the carbon material itself causes irreversible capacity of a power storage device. Thus, a carbon material whose R value is less than 1.1, preferably less than 0.4 is preferably included in a negative electrode active material layer. When a carbon material with a high degree of graphitization is included in a negative electrode active material layer, the initial irreversible capacity of a power storage device can be low. It is needless to say that a carbon material whose R value is 1.1 or more may be included in a negative electrode active material layer as long as the irreversible capacity of a power storage device is not influenced by the carbon material content.

As the negative electrode active material, other than the above carbon materials, an alloy-based material which enables charge-discharge reaction by alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used as the alloy-based material. Such metals have higher capacity than carbon. In particular, silicon has a significantly high theoretical capacity of 4200 mAh/g. For this reason, silicon is preferably used as the negative electrode active material.

In the case where the electrode 101 is a positive electrode, a material into and from which carrier ions can be inserted and extracted is used for a positive electrode active material. For example, a compound such as LiFeO$_2$, LiCoO$_2$, LiNiO$_2$, LiMn$_2$O$_4$, V$_2$O$_5$, Cr$_2$O$_5$, and MnO$_2$ can be used.

Alternatively, a lithium-containing complex phosphate (LiMPO$_4$ (general formula) (M is one or more of Fe(II), Mn(II), Co(II), and Ni(II)) can be used. Typical examples of LiMPO$_4$ (general formula) which can be used as a material are lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

Alternatively, a lithium-containing complex silicate such as Li$_{(2-j)}$MSiO$_4$ (general formula) (M is one or more of Fe(II), Mn(II), Co(II), and Ni(II); 0≤j≤2) may be used. Typical examples of Li$_{(2-j)}$MSiO$_4$ (general formula) which can be used as a material are lithium compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Examples of carrier ions used for a power storage device are lithium ions, which are a typical example thereof; alkali-metal ions other than lithium ions; and alkaline-earth metal ions. In the case where ions other than lithium ions are used as carrier ions, the following may be used as the positive electrode active material: a compound which is obtained by substituting an alkali metal (e.g., sodium or potassium), an alkaline-earth metal (e.g., calcium, strontium, barium, beryllium, or magnesium) for lithium in any of the above lithium compounds, the lithium-containing complex phosphates, and the lithium-containing complex silicates and a composite of the obtained compounds.

FIG. 1B is an enlarged schematic view of a cross section of the active material layer 103. FIG. 1B illustrates a plurality of active material particles 111. There is no particular limitation on the average diameter of the active material particles 111; active material particles with general average diameter or diameter distribution are used. In the case where the active material particles 111 are negative electrode active material particles used for a negative electrode, negative electrode active material particles with an average diameter in the range from 1 μm to 50 μm, for example, can be used. In the case where the active material particles 111 are positive electrode active material particles used for a positive electrode and each of the positive electrode active material particles is a secondary particle, the average diameter of primary particles composing the secondary particle can be in the range from 10 nm to 1 μm.

The plurality of active material particles 111 are in contact with each other; thus, the surface of one of the active material particles 111 has a region in contact with one of the other active material particles 111. The surface of the active material particle except the region is partly or entirely covered with a film 112. In is preferable that the film 112 cover the entire surface except the region where a plurality of the active material particles 111 are in contact with each other; however, it may partly covers the surface. Further, the plurality of active material particles 111 are bound with a binder 113; accordingly, the film 112 is also in contact with the binder 113. In some cases, the active material layer 103 includes a space 114 formed by a plurality of the active material particles 111.

As the binder 113, a material which can bind the active material, the conductive additive, and the current collector is used. For example, any of the following can be used as the binder 113: resin materials such as poly(vinylidene fluoride) (PVDF), a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, and polyimide.

It is preferable that carrier ions can pass through the film 112. Thus, it is preferable that the film 112 be formed using a material through which carrier ions can pass, and be thin enough to allow carrier ions to pass through the film.

A film containing metal oxide or silicon oxide as a main component can be used as the film 112. For the film containing metal oxide as a main component, an oxide film of any one of niobium, titanium, vanadium, tantalum, tungsten, zirconium, molybdenum, hafnium, chromium, and aluminum or an oxide film containing lithium and one or more of these elements can be used. Alternatively, a film containing silicon oxide as a main component can be used. Note that "main component" refers to an element determined by energy dispersive X-ray spectrometry (EDX).

For example, in the case where graphite is used as an active material, a film containing silicon oxide as a main component preferably has a mesh structure where a carbon atom in the graphite is bonded to a silicon atom through an oxygen atom and the silicon atom is bonded to another silicon atom through an oxygen atom.

The thickness of the film 112 is, for example, preferably 1 nm to 10 μm, more preferably 10 nm to 1 μm.

Further, the product of the electric resistivity and the thickness of the film 112 at 25° C. is greater than or equal to 20 Ωm·m, preferably greater than or equal to 200 Ωm·m. When the product of the electric resistivity and the thickness of the film 112 at 25° C. is greater than or equal to 20 Ωm·m, the decomposition reaction between the active material particle 111 and an electrolytic solution can be reduced. Further, when the product of the electric resistivity and the thickness of the film 112 at 25° C. is greater than or equal to 200 Ω·m, the decomposition reaction between the active material particle 111 and an electrolytic solution can be inhibited. When the product of the electric resistivity and the thickness of the film 112 at 25° C. is greater than or equal to 200 Ωm·m, electrons can be prevented from being supplied into the interface between the surface of the negative electrode active material and an electrolytic solution on charge and discharge of a power storage device, so that the decomposition of the electrolytic solution can be inhibited. Thus, the irreversible decomposition reaction can be inhibited.

In the case of using, as the active material particle 111, an active material particle whose volume is changed on charge and discharge, the film 112 is preferably changed in shape accordingly when the active material particle 111 is changed in shape because of the change in volume thereof. Therefore, the Young's modulus of the film 112 is preferably less than or equal to 70 GPa. The film 112 which covers part or the entire of the surface of the active material particle 111 can be changed following a change in shape due to the change in volume of the active material particle 111, so that separation of the film 112 from the active material particle 111 can be suppressed.

The plurality of active material particles 111 are in contact with each other and thus the surface of one of the active material particles 111 has a region in contact with one of the other active material particles 111, and the surface of the active material particle except the region is partly or entirely covered with the film 112, whereby the reductive decomposition of an electrolytic solution can be inhibited. Accordingly, formation of a passivating film on the active material particle due to the reductive decomposition of the electrolytic solution can be inhibited, resulting in inhibition of a reduction in the initial capacity of a power storage device.

The film 112 which covers the surfaces of the active material particles 111 can be changed in shape accordingly when the active material particle 111 is changed in shape because of the change in volume thereof, so that separation of the film 112 from the active material particle 111 can be prevented. Further, when an increase in the thickness of a passivating film on repeated charge and discharge is inhibited, the passivating film is less likely to be influenced by volume expansion of the active material particle, so that separation of the passivating film from the active material particle 111 can be suppressed.

Here, a conduction path of electrons of the plurality of active material particles 111 will be described. As illustrated in FIG. 1C1, when the active material particles 111 each covered with the film 112 are in contact with each other, the film inhibits electron conduction, resulting in an increase in the resistance of the electrode and a reduction in the substantial capacity of a power storage device.

In contrast, when the surface of one of the active material particles 111 has a region in contact with one of the other active material particles and the surface except the region is partly or entirely covered with the film 112 as illustrated in FIG. 1C2, electron conduction can be prevented from being inhibited by the film. Accordingly, an increase in the resistance of an electrode can be suppressed and the capacity of a power storage device can be increased.

As described above, in the electrode for a power storage device of one embodiment of the present invention, the surface of the active material particle 111 is stabilized by the film 112 which covers part or the entire of the surface of the active material particle 111, resulting in minimization of the electrochemical decomposition of an electrolytic solution and the like around the electrode.

Further, when the electrode for a power storage device is used in a power storage device such as a lithium-ion battery or a lithium-ion capacitor to minimize the decomposition reaction of an electrolytic solution as a side reaction of charge and discharge in the repeated charge and discharge cycles of the power storage device, the long-term cycle performance of the power storage device such as a lithium-ion battery or a lithium-ion capacitor can be improved.

This embodiment can be implemented in combination with any of the other embodiments and examples as appropriate.

(Embodiment 2)

In this embodiment, an example of a manufacturing method of an electrode for a power storage device will be described with reference to FIG. 2.

First, an active material, a binder, and a solvent are mixed to form a slurry (Step 151). For the active material and the binder, any of the materials given in Embodiment 1 can be used. For the solvent, N-methylpyrrolidone (NMP) can be used. In this embodiment, graphite, PVDF, and NMP are used as the active material, the binder, and the solvent, respectively. Note that the slurry may contain a conductive additive.

Then, the slurry is applied to one of or both the surfaces of a current collector, and dried (Step 152). In the case where both the surfaces of the current collector are subjected to the coating step, the slurry is applied to the surfaces at the same time or one by one, and dried. After that, rolling with a roller press machine is performed, whereby active material layers are formed so that the current collector is sandwiched therebetween.

In this embodiment, the film is formed on the active material by a liquid-phase method such as a dip coating method.

First, an organometallic compound or an organosilicon compound, a solvent, and a catalyst are mixed to prepare a treatment liquid (Step 153).

Examples of the organometallic compound are an organic aluminum compound and an organogallium compound. Examples of the organosilicon compound are ethyl polysilicate, methyl polysilicate, propyl polysilicate, butyl polysilicate, tetramethoxysilane, tetraethoxysilane, tetrabutoxysilane, and tetrapropoxysilane. Further, an oligomer obtained by partial hydrolysis and condensation of any of the organosilicon compounds may be used. An organic composite metal compound containing a lithium compound such as an organic lithium silicate compound or an organic lithium aluminate compound may be used.

In the case of using the organosilicon compound, the concentration of silicon oxide contained in the treatment liquid is, for example, greater than or equal to 0.1 wt % and less than or equal to 40 wt %, preferably greater than or equal to 0.8 wt % and less than or equal to 20 wt %.

In this embodiment, ethyl silicate as Pentamer is used as the organosilicon compound.

As the solvent, ethanol can be used, and as the catalyst, hydrochloric acid can be used. Further, water may be added as an additive.

Next, the active material layer formed over the current collector is soaked in the treatment liquid either in a vacuum or in the air (Step 154).

Then, the active material layer formed over the current collector is taken out of the treatment liquid, and the solvent in the treatment liquid permeating the active material layer is evaporated (Step 155).

After that, heat treatment is performed on the active material layer formed over the current collector (Step 156). The heat treatment is performed, for example, on a hot plate at 70° C. Through the heat treatment, the organometallic compound or the organosilicon compound attached to the active material layer reacts with moisture in the air, so that hydrolysis occurs, and the organometallic compound or the organosilicon compound after the hydrolysis is condensed in association with the hydrolysis. Consequently, a film containing metal oxide or silicon oxide as a main component is formed on the surface of the active material. Further, when an enclosed space to which water is added with water vapor is used, time for hydrolysis can be shortened.

In the active material layer, the plurality of active material particles are in contact with each other and bound with the binder. The active material layer in this state is soaked in the treatment liquid containing the organometallic compound or the organosilicon compound, whereby the treatment liquid permeates the whole active material layer while the plurality of active material particles remain in contact with each other. After that, heat treatment is performed so that hydrolysis and condensation reaction of the organometallic compound or the organosilicon compound occurs, whereby metal oxide films or silicon oxide films can be formed on the surfaces of the plurality of active material particles. In this embodiment, silicon oxide films are formed on the surfaces of the plurality of active material particles.

For example, in the case where graphite is used as an active material, a film containing silicon oxide as a main component preferably has a mesh structure where a carbon atom in the graphite is bonded to a silicon atom through an oxygen atom and the silicon atom is bonded to another silicon atom through an oxygen atom.

For example, in the case where films are formed on the surfaces of active material particles and then a slurry is formed to form an active material layer, the films formed on the active material particles are in contact with each other, so that electron conduction might be inhibited and thus the resistance of an electrode might be increased. Consequently, the substantial capacity of a power storage device might be reduced.

As described in this embodiment, when an active material layer is formed over a current collector and then a film is formed on the active material, the surfaces of the plurality of active material particles except regions where a plurality of the active material particles are in contact with each other can be partly or entirely covered with the film while the plurality of active material particles remain in contact with each other. Thus, an increase in the resistance of an electrode due to contact between films formed on the active material particles can be prevented, leading to suppression of a reduction in the capacity of a power storage device.

The use of a liquid-phase method such as a dip coating method enables the treatment liquid to permeate the whole active material layer and enter a space formed by a plurality of the active material particles. Through hydrolysis and condensation reaction after the permeation and the entry of the treatment liquid, the metal oxide film can also be formed in the space formed by the plurality of the active material particles. Further, the surfaces of the active material particles can be prevented from being exposed; therefore, the area of contact between the active material particles and the electrolytic solution can be reduced. Consequently, the decomposition of the electrolytic solution can be inhibited, resulting in prevention of formation of a passivating film.

This embodiment can be implemented in combination with any of the other embodiments and examples as appropriate.

(Embodiment 3)

In this embodiment, a power storage device including an electrode for a power storage device and a manufacturing method of the power storage device will be described with reference to FIGS. 3A to 7B.

FIG. 3A is a cross-sectional view of a negative electrode 200 which includes a negative electrode current collector 201 and a negative electrode active material layer 202 provided over one of surfaces of the negative electrode current collector 201 or negative electrode active material layers 202 provided so that the negative electrode current collector 201 is sandwiched therebetween. In the drawing, the negative electrode active material layers 202 are provided so that the negative electrode current collector 201 is sandwiched therebetween.

In this embodiment, an example where graphene is used as a conductive additive added to the negative electrode active material layer 202 will be described with reference to FIG. 3B.

Figure 3B:
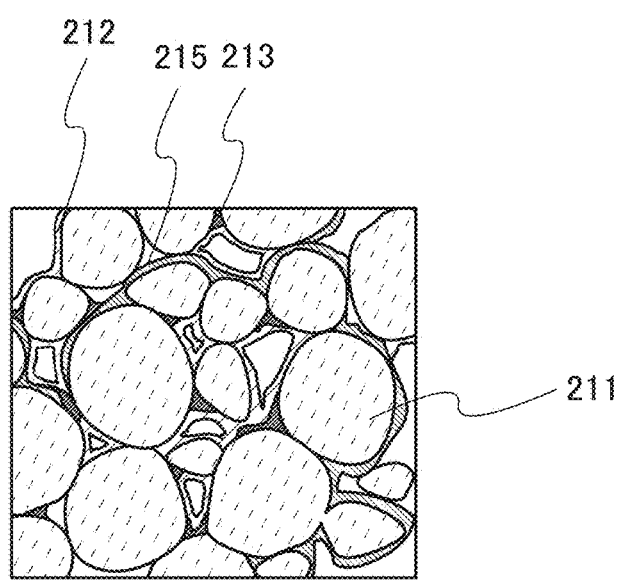

FIG. 3B is an enlarged schematic view of a cross section of the negative electrode active material layer 202 including graphene. The negative electrode active material layer 202 includes a plurality of negative electrode active material particles 211, a film 212, a binder 213, and graphenes 215. The graphenes 215 each are a thin sheet with a thickness of several micrometers to several tens of micrometers and thus can cover a plurality of the negative electrode active material particles 211. The graphenes 215 appear linear in cross section. One graphene or a plurality of the graphenes overlap with a plurality of the negative electrode active material particles 211, or the plurality of the negative electrode active material particles 211 are at least partly surrounded with one graphene or a plurality of the graphenes. Note that the graphene 215 has a bag-like shape, and a plurality of the negative electrode active materials are at least partly surrounded with the graphene 215 with the bag-like shape in some cases. The graphene 215 partly has openings where the negative electrode active material particles 211 are exposed in some cases.

An example of the negative electrode active material particle 211 is a material whose volume is expanded by reception of carrier ions. When such a material is used, the negative electrode active material layer gets vulnerable and is partly collapsed on charge and discharge, resulting in lower reliability (e.g., inferior cycle characteristics) of a power storage device. However, the graphene 215 covering the periphery of the negative electrode active material particles 211 can prevent dispersion of the negative electrode active material particles 211 and the collapse of the negative electrode active material layer 202, even when the volume of the negative electrode active material particles is increased and decreased on charge and discharge. That is to say, the graphene 215 has a function of maintaining the bond between the negative electrode active material particles 211 even when the volume of the negative electrode active material particles 211 is increased and decreased on charge and discharge.

Further, the plurality of negative electrode active material particles 211 are bound with the binder 213. The negative electrode active material particles 211 may be bound with the binder 213 in the state where they are in contact with each other or in the state where they are bonded to each other with the graphene 215 interposed therebetween. Although FIG. 3B illustrates the case where the binder 213 is used, the binder 213 does not necessarily have to be added in the case where the graphenes 215 are included so many as to sufficiently function as a binder by being bound with each other.

That is to say, when a binder is not used in forming the negative electrode active material layer 202, the proportion of the negative electrode active material particles in the negative electrode active material layer 202 with certain weight (certain volume) can be increased, leading to an increase in charge and discharge capacity per unit weight (unit volume) of the electrode.

The graphene 215 efficiently forms a sufficient electron conductive path in the negative electrode active material layer 202, so that the conductivity of the negative electrode for a power storage device can be increased.

The graphene 215 also functions as a negative electrode active material capable of receiving and releasing carrier ions, leading to an increase in the charge and discharge capacity of the negative electrode for a power storage device.

Further, as illustrated in FIG. 3B, an exposed surface of the negative electrode active material particle 211 is partly or entirely covered with the film 212. The film 212 does not prevent contact between the negative electrode active material particles 211.

In the negative electrode illustrated in FIG. 3B, the plurality of negative electrode active material particles 211 are in contact with each other and the surfaces of the plurality of negative electrode active material particles 211 except regions where a plurality of the negative electrode active material particles 211 are in contact with each other are partly or entirely covered with the film 212, whereby the reductive decomposition of an electrolytic solution can be inhibited. Accordingly, formation of a passivating film on the negative electrode active material particles 211 due to the reductive decomposition of the electrolytic solution can be inhibited, resulting in suppression of a reduction in the initial capacity of a power storage device.

Having flexibility, the graphenes 215 and the film 212 can be changed in shape accordingly when the volume of the negative electrode active material particles 211 expands because of reception of carrier ions. Thus, separation of the graphenes 215 and the film 212 from the negative electrode active material particles 211 can be prevented. Further, when an increase in the thickness of the film 212 on repeated charge and discharge is inhibited, the film 212 is less likely to be influenced by volume expansion of the negative electrode active material particles, so that separation of the film 212 from the negative electrode active material particles 211 can be suppressed.

As described above, in the negative electrode 200, the surfaces of the negative electrode active material particles 211 are stabilized by the film 212 which covers part or the entire of the surfaces of the negative electrode active material particles 211, resulting in minimization of the electrochemical decomposition of an electrolytic solution and the like around the negative electrode 200.

Further, when the electrode for a power storage device is used in a power storage device such as a lithium-ion battery or a lithium-ion capacitor in order to minimize the decomposition reaction of an electrolytic solution as a side reaction of charge and discharge in the repeated charge and discharge cycles of the power storage device, the long-term cycle performance of the power storage device such as a lithium-ion battery or a lithium-ion capacitor can be improved.

The desired thickness of the negative electrode active material layer 202 is determined in the range from 20 μm to 150 μm.

The negative electrode active material layer 202 may be predoped with lithium in such a manner that a lithium layer is formed on a surface of the negative electrode active material layer 202 by a sputtering method. Alternatively, lithium foil is provided on the surface of the negative electrode active material layer 202, whereby the negative electrode active material layer 202 can be predoped with lithium.

Next, a formation method of the negative electrode active material layer 202 in FIGS. 3A and 3B will be described.

First, the plurality of negative electrode active material particles 211 are mixed into a dispersion containing graphene oxides and then a binder is mixed into the mixture to form a slurry. By mixing the dispersion containing graphene oxides and the plurality of negative electrode active material particles 211 first, the graphene oxides can be dispersed uniformly. Since the binder is added in the state where the graphene oxides are dispersed uniformly, contact between the negative electrode active material particles 211 and the graphene oxides can be prevented from being obstructed by the binder. Note that the binder does not necessarily have to be added.

Then, the slurry is applied to one of or both the surfaces of the negative electrode current collector 201, and dried. After that, rolling with a roller press machine is performed.

After that, the graphene oxides are electrochemically reduced with electric energy or thermally reduced by heat treatment to form the graphenes 215, and the negative electrode active material layer 202 including the plurality of negative electrode active material particles 211 and the graphenes 215 is formed over the negative electrode current collector 201. Particularly in the case where electrochemical reduction treatment is performed, the proportion of π bonds of graphene formed by the electrochemical reduction treatment is higher than that of graphene formed by heat treatment; therefore, the graphenes 215 having high conductivity can be formed.

After that, the negative electrode active material layer 202 formed over the negative electrode current collector 201 is soaked in a treatment liquid containing an organometallic compound or an organosilicon compound, whereby the treatment liquid permeates the negative electrode active material layer 202. The details of the treatment liquid are described in Embodiment 2.

Then, the negative electrode active material layer 202 is taken out of the treatment liquid, and the solvent in the treatment liquid permeating the negative electrode active material layer 202 is evaporated. After that, heat treatment is performed on the negative electrode active material layer 202 formed over the negative electrode current collector 201. Through the heat treatment, the organometallic compound or the organosilicon compound attached to the negative electrode active material layer 202 reacts with moisture in the air, so that hydrolysis occurs, and the organometallic compound or the organosilicon compound after the hydrolysis is condensed in association with the hydrolysis. Consequently, the film 212 containing metal oxide or silicon oxide as a main component is formed on the surfaces of the negative electrode active material particles 211.

Through the above steps, the negative electrode 200 in which the negative electrode active material layer 202 including the plurality of negative electrode active material particles 211, the film 212, the binder 213, and the graphenes 215 is formed over the negative electrode current collector 201 can be formed. Although the case where the negative electrode active material layer 202 includes the graphenes 215 is described in this embodiment, the negative electrode active material layer 202 does not necessarily include the graphenes 215.

Next, a positive electrode and a formation method thereof will be described with reference to FIGS. 4A and 4B.

Figure 4A:
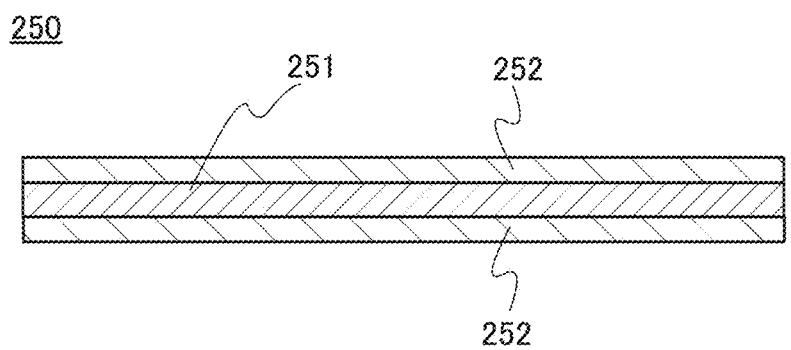
FIGS. 4A and 4B illustrate a positive electrode.

FIG. 4A is a cross-sectional view of a positive electrode 250 which includes a positive electrode current collector 251 and a positive electrode active material layer 252 provided over one of surfaces of the positive electrode current collector 251 or positive electrode active material layers 252 provided so that the positive electrode current collector 251 is sandwiched therebetween. In the drawing, the positive electrode active material layers 252 are provided so that the positive electrode current collector 251 is sandwiched therebetween.

The positive electrode active material layer 252 does not necessarily have to be formed on and in direct contact with the positive electrode current collector 251. Any of the following functional layers may be formed using a conductive material such as a metal between the positive electrode current collector 251 and the positive electrode active material layer 252: an adhesion layer for increasing the adhesion between the positive electrode current collector 251 and the positive electrode active material layer 252; a planarization layer for reducing the roughness of the surface of the positive electrode current collector 251; a heat dissipation layer; a stress relaxation layer for relaxing the stress on the positive electrode current collector 251 or the positive electrode active material layer 252; and the like.

In this embodiment, an example where graphenes are used as a conductive additive added to the positive electrode active material layer 252 will be described with reference to FIG. 4B.

Figure 4B:
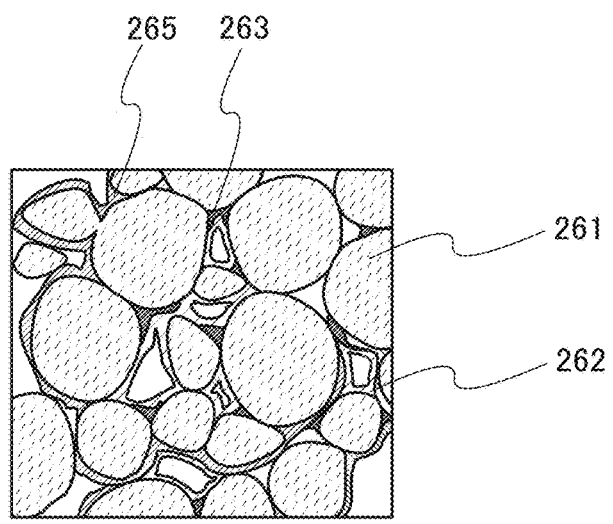

FIG. 4B is an enlarged schematic view of a cross section of the positive electrode active material layer 252 including graphene. The positive electrode active material layer 252 includes a plurality of positive electrode active material particles 261, a film 262, a binder 263, and graphenes 265.

The graphenes 265 each are a thin sheet with a thickness of several micrometers to several tens of micrometers and thus can cover a plurality of the positive electrode active material particles 261. The graphenes 265 appear linear in cross section. A plurality of the positive electrode active material particles are at least partly surrounded with one graphene or a plurality of the graphenes or sandwiched between a plurality of the graphenes. Note that the graphene has a bag-like shape, and a plurality of the positive electrode active material particles are surrounded with the graphene with the bag-like shape in some cases. In addition, part of the positive electrode active material particles is not covered with the graphenes 265 and exposed in some cases.

The positive electrode active material layer 252 includes positive electrode active material particles 261 which are capable of receiving and releasing carrier ions, and graphenes 265 which cover a plurality of the positive electrode active material particles 261 and at least partly surround the plurality of the positive electrode active material particles 261. The different graphenes 265 cover the surfaces of the plurality of the positive electrode active material particles 261. The positive electrode active material particles 261 may partly be exposed.

The size of the positive electrode active material particle 261 is preferably greater than or equal to 20 nm and less than or equal to 100 nm. Note that the size of the positive electrode active material particle 261 is preferably smaller because electrons transfer in the positive electrode active material particles 261.

Sufficient characteristics can be obtained even when the surface of the positive electrode active material particle 261 is not covered with a graphite layer; however, it is preferable to use both the graphene and the positive electrode active material particle covered with a graphite layer because current flows.

Further, the plurality of positive electrode active material particles 261 are bound with the binder 263. The positive electrode active material particles 261 may be bound with the binder 263 in the state where they are in contact with each other or in the state where they are bonded to each other with the graphene 265 interposed therebetween. Although FIG. 4B illustrates the case where the binder 263 is used, the binder 263 does not necessarily have to be added in the case where the graphenes 265 are included so many as to sufficiently function as a binder by being bound with each other.

That is to say, when a binder is not used in forming the positive electrode active material layer 252, the proportion of the positive electrode active material particles in the positive electrode active material layer 252 with certain weight (certain volume) can be increased, leading to an increase in charge and discharge capacity per unit weight (unit volume) of the electrode.

The graphene 265 efficiently forms a sufficient electron conductive path in the positive electrode active material layer 252, so that the conductivity of the positive electrode for a power storage device can be increased.

As illustrated in FIG. 4B, an exposed surface of the positive electrode active material particle 261 is partly or entirely covered with the film 262. The film 262 does not prevent contact between the positive electrode active material particles 261.

In the positive electrode illustrated in FIG. 4B, the plurality of positive electrode active material particles 261 are in contact with each other and the surfaces of the plurality of positive electrode active material particles 261 except regions where a plurality of the positive electrode active material particles 261 are in contact with each other are partly or entirely covered with the film 262, whereby the oxidative decomposition of an electrolytic solution can be inhibited. Accordingly, formation of a passivating film on the positive electrode active material particles 261 due to the oxidative decomposition of the electrolytic solution can be inhibited, resulting in suppression of a reduction in the initial capacity of a power storage device.

Having flexibility, the graphenes 265 and the film 262 can be changed in shape accordingly following expansion of the volume of the positive electrode active material particles 261 due to reception of carrier ions. Thus, separation of the graphenes 265 and the film 262 from the positive electrode active material particles 261 can be prevented.

The desired thickness of the positive electrode active material layer 252 is determined in the range from 20 µm to 100 µm. It is preferable to adjust the thickness of the positive electrode active material layer 252 as appropriate so that a crack and flaking are not caused.

Note that the positive electrode active material layer 252 may include acetylene black particles having a volume 0.1 times to 10 times as large as that of the graphene, carbon particles having a one-dimensional expansion such as carbon nanofibers, or other known conductive additives.

Depending on a material of positive electrode active material particles, the volume is expanded because of reception of ions serving as carriers. When such a material is used, a positive electrode active material layer gets vulnerable and is partly collapsed on charge and discharge, resulting in lower reliability of a power storage device. However, graphene covering the periphery of positive electrode active material particles allows prevention of dispersion of the positive electrode active material particles and the collapse of a positive electrode active material layer, even when the volume of the positive electrode active material particles is increased and decreased on charge and discharge. That is to say, the graphene has a function of maintaining the bond between the positive electrode active material particles even when the volume of the positive electrode active material particles is increased and decreased on charge and discharge.

The graphene 265 is in contact with a plurality of the positive electrode active material particles and serves also as a conductive additive. Further, the graphene 265 has a function of holding the positive electrode active material particles capable of receiving and releasing carrier ions. Thus, a binder does not have to be mixed into the positive electrode active material layer. Accordingly, the proportion of the positive electrode active material particles in the positive electrode active material layer can be increased, which allows an increase in charge and discharge capacity of a power storage device.

Next, a method for forming the positive electrode active material layer 252 will be described.

First, a slurry containing positive electrode active material particles and graphene oxide is formed. Then, the slurry is applied to the positive electrode current collector 251. After that, heating is performed in a reducing atmosphere for reduction treatment so that the positive electrode active material particles are baked and part of oxygen is released from graphene oxide to form graphene. Note that oxygen in the graphene oxide might not be entirely released and partly remains in the graphene. Through the above steps, the positive electrode active material layer 252 can be provided over the positive electrode current collector 251. Consequently, the positive electrode active material layers 252 have higher conductivity.

Graphene oxide contains oxygen and thus is negatively charged in a polar liquid. As a result of being negatively charged, graphene oxide is dispersed in the polar liquid. Accordingly, the positive electrode active material particles contained in the slurry are not easily aggregated, so that the size of the positive electrode active material particle can be prevented from increasing. Thus, the transfer of electrons in the positive electrode active material particles is facilitated, resulting in an increase in conductivity of the positive electrode active material layer.

Subsequently, the positive electrode active material layer 252 formed over the positive electrode current collector 251 is soaked in a treatment liquid containing an organometallic compound, whereby the treatment liquid permeates the positive electrode active material layer 252. The details of the treatment liquid are described in Embodiment 2.

Then, the positive electrode active material layer 252 is taken out of the treatment liquid, and the solvent in the treatment liquid permeating the positive electrode active material layer 252 is evaporated. After that, heat treatment is performed on the positive electrode active material layer 252 formed over the positive electrode current collector 251. Through the heat treatment, the organometallic compound attached to the positive electrode active material layer 252 reacts with moisture in the air, so that hydrolysis occurs, and the organometallic compound after the hydrolysis is condensed in association with the hydrolysis. Consequently, the film 262 containing metal oxide as a main component is formed on the surfaces of the positive electrode active material particles 261.

Through the above steps, the positive electrode 250 in which the positive electrode active material layer 252 including the plurality of positive electrode active material particles 261, the film 262, the binder 263, and the graphenes 265 is formed over the positive electrode current collector 251 can be formed. Although the case where the positive electrode active material layer 252 includes the graphenes 265 is described in this embodiment, the positive electrode active material layer 252 does not necessarily include the graphenes 265.

Next, a power storage device and a manufacturing method thereof will be described. Here, the structure and a manufacturing method of a lithium-ion battery, which is one mode of the power storage device, will be described with reference to FIGS. 5A to 7B. Here, a cross-sectional structure of the lithium-ion battery will be described below.

(Coin-type Secondary Battery)

Figure 5A:
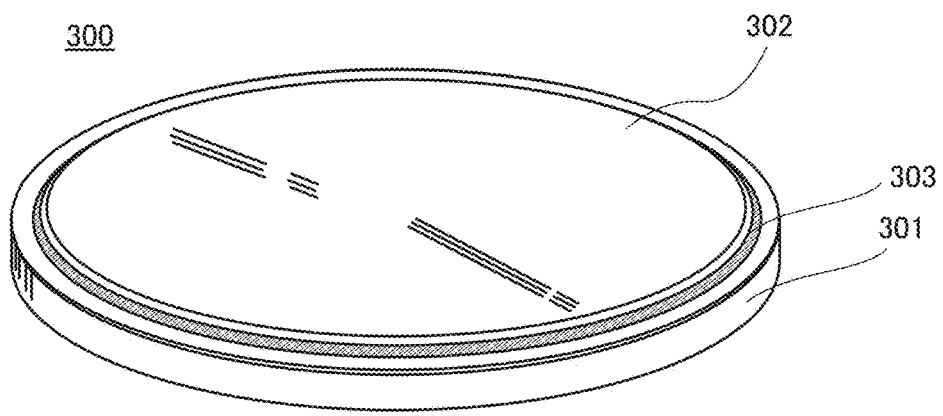
FIGS. 5A and 5B illustrate a coin-type lithium-ion battery.
Figure 5B:
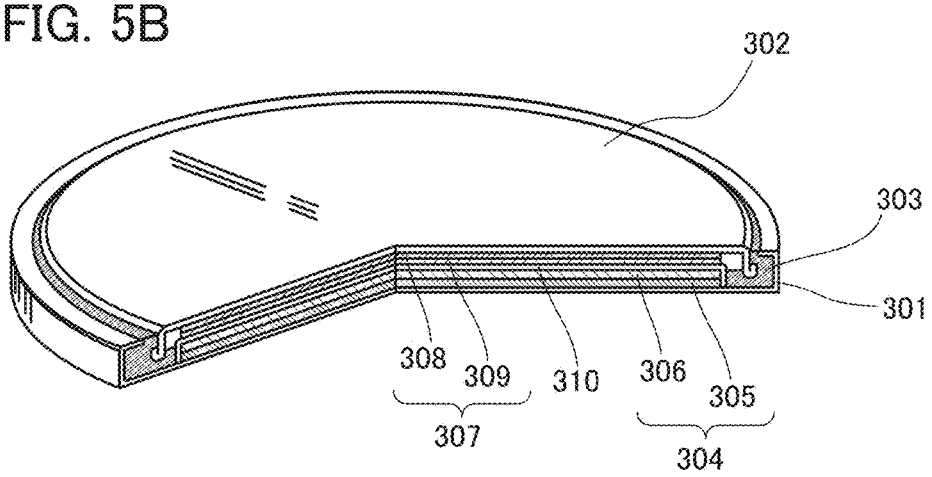

FIG. 5A is an external view of a coin-type (single-layer flat type) secondary battery. FIG. 5B is a cross-sectional view of the coin-type secondary battery.

In a coin-type lithium-ion battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308. A separator 310 and an electrolytic solution (not illustrated) are provided between the positive electrode active material layer 306 and the negative electrode active material layer 309.

As at least one of the positive electrode 304 and the negative electrode 307, the electrode for a power storage device of one embodiment of the present invention can be used.

Next, as the separator 310, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

As a solvent for the electrolytic solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolytic solution, safety against liquid leakage and the like is improved. Further, a secondary battery can be thinner and more lightweight. Typical examples of the gelled high-molecular material include a silicone gel, an acrylic gel, an acrylonitrile gel, polyethylene oxide, polypropylene oxide, a fluorine-based polymer, and the like.

Alternatively, the use of one or more of ionic liquids (room temperature ionic liquids) which has non-flammability and non-volatility as the solvent for the electrolytic solution can prevent the secondary battery from exploding or catching fire even when the secondary battery internally shorts out or the internal temperature increases because of overcharging or the like.

As an electrolyte dissolved in the above solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

As an electrolyte of the electrolytic solution, a material which contains carrier ions is used. Typical examples of the electrolyte of the electrolytic solution include lithium salts such as $LiClO_4$, $LiAsF_6$, $LiBF_4$, $LiPF_6$, and $Li(C_2F_5SO_2)_2N$.

Note that when carrier ions are alkali metal ions other than lithium ions, or alkaline-earth metal ions, instead of lithium in the above lithium salts, an alkali metal (e.g., sodium or potassium), an alkaline-earth metal (e.g., calcium, strontium, barium, beryllium, or magnesium) may be used for the electrolyte.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator is not necessary. Further, the battery can be entirely solidified; therefore, there is no possibility of liquid leakage and thus the safety of the battery is dramatically increased.

For the positive electrode can 301 and the negative electrode can 302, a metal having corrosion resistance to an electrolytic solution, such as nickel, aluminum, or titanium, an alloy of such metals, or an alloy of such a metal and another metal (stainless steel or the like) can be used. Alternatively, it is preferable to cover the positive electrode can 301 and the negative electrode can 302 with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 5B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type lithium-ion battery 300 can be fabricated.

(Laminated Secondary Battery)

Next, an example of a laminated secondary battery will be described with reference to FIG. 6.

A laminated lithium-ion battery 400 illustrated in FIG. 6 can be obtained in such a manner that a positive electrode 403 including a positive electrode current collector 401 and a positive electrode active material layer 402, a separator 407, and a negative electrode 406 including a negative electrode current collector 404 and a negative electrode active material layer 405 are stacked and sealed in an exterior body 409 and then an electrolytic solution 408 is injected into the exterior body 409. Although the laminated lithium-ion battery 400 in FIG. 6 has a structure where one sheet-like positive electrode 403 and one sheet-like negative electrode 406 are stacked, it is preferable to roll the stack or to stack a plurality of the stacks and then laminate them in order to increase battery capacity. Particularly in the case of the laminated lithium-ion battery, the battery has flexibility and thus is suitable for applications which require flexibility.

In the laminated lithium-ion battery 400 illustrated in FIG. 6, the positive electrode current collector 401 and the negative electrode current collector 404 also function as terminals for electrical contact with an external portion. For this reason, each of the positive electrode current collector 401 and the negative electrode current collector 404 is provided so as to be partly exposed on the outside of the exterior body 409.

As the exterior body 409 in the laminated lithium-ion battery 400, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

The positive electrode 403 and the negative electrode 406 and the laminated lithium-ion battery 400 are formed in a manner similar to those of the positive electrode and the negative electrode in the above coin-type lithium-ion battery and the coin-type lithium-ion battery (Cylindrical Secondary Battery)

Figure 7A:
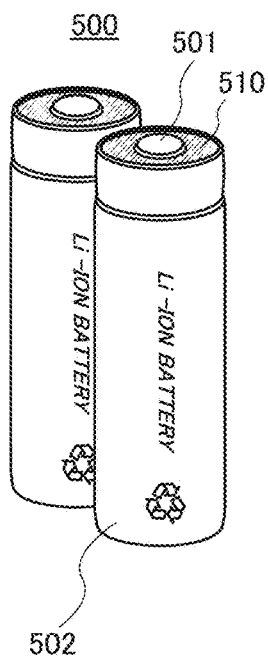
FIGS. 7A and 7B illustrate a cylindrical lithium-ion battery.

Next, an example of a cylindrical secondary battery will be described with reference to FIGS. 7A and 7B. As illustrated in FIG. 7A, a cylindrical lithium-ion battery 500 includes a positive electrode cap (battery cap) 501 on the top surface and a battery can (outer can) 502 on the side surface and bottom surface. The positive electrode cap 501 and the battery can 502 are insulated from each other by a gasket (insulating gasket) 510.

Figure 7B:
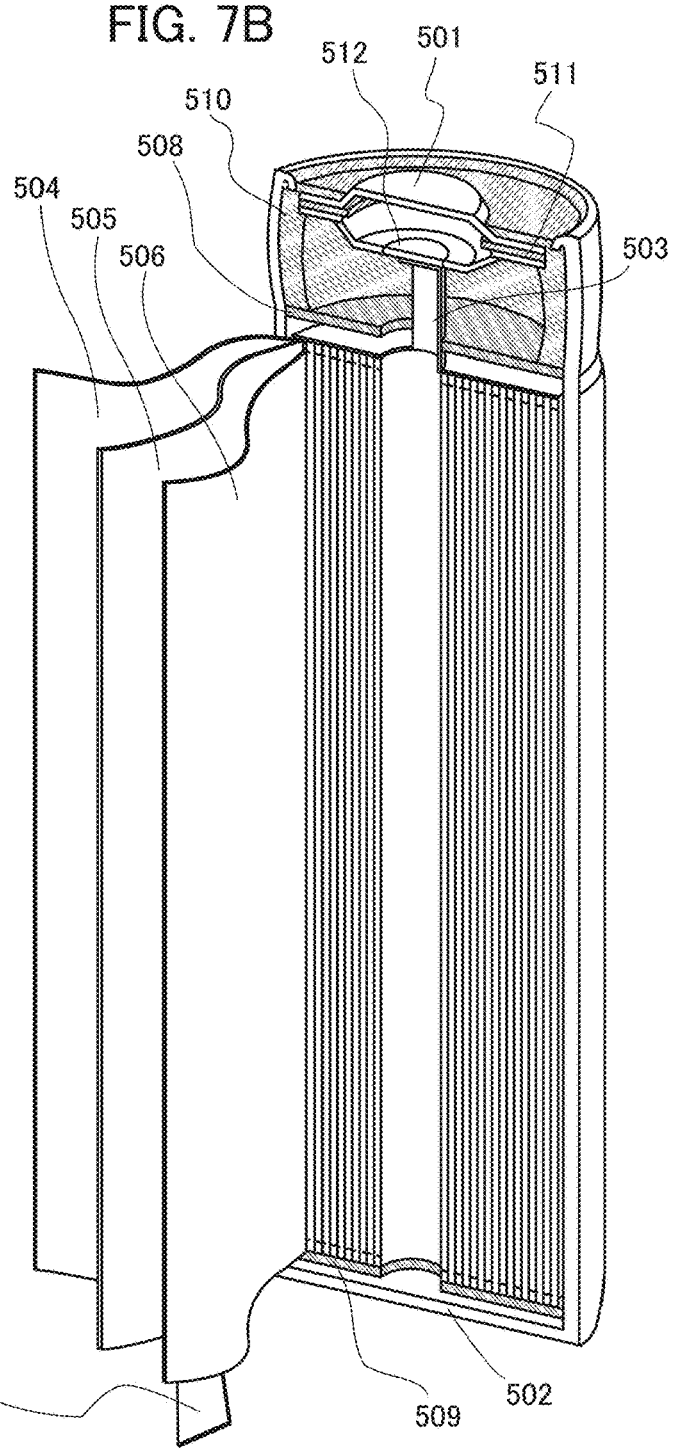

FIG. 7B is a diagram schematically illustrating a cross section of the cylindrical lithium-ion battery. Inside the battery can 502 having a hollow cylindrical shape, a battery element in which a strip-like positive electrode 504 and a strip-like negative electrode 506 are wound with a stripe-like separator 505 interposed therebetween is provided. Although not illustrated, the battery element is wound around a center pin. One end of the battery can 502 is close and the other end thereof is open. For the battery can 502, a metal having corrosion resistance to an electrolytic solution, such as nickel, aluminum, or titanium, an alloy of such a metal, or an alloy of such a metal and another metal (stainless steel or the like) can be used. Further, it is preferable to cover the metal or the like with nickel, aluminum, or the like in order to prevent corrosion by the electrolytic solution. Inside the battery can 502, the battery element in which the positive electrode, the negative electrode, and the separator are wound is interposed between a pair of insulating plates 508 and 509 which face each other. Further, an electrolytic solution (not illustrated) is injected inside the battery can 502 provided with the battery element. As the electrolytic solution, an electrolytic solution which is similar to those in the above coin-type secondary battery and the above laminated secondary battery can be used.

Although the positive electrode 504 and the negative electrode 506 can be formed in a manner similar to that of the positive electrode and the negative electrode of the coin-type lithium-ion battery described above, the difference lies in that, since the positive electrode and the negative electrode of the cylindrical lithium-ion battery are wound, active materials are formed on both sides of the current collectors. A positive electrode terminal (positive electrode current collecting lead) 503 is connected to the positive electrode 504, and a negative electrode terminal (negative electrode current collecting lead) 507 is connected to the negative electrode 506. Both the positive electrode terminal 503 and the negative electrode terminal 507 can be formed using a metal material such as aluminum. The positive electrode terminal 503 and the negative electrode terminal 507 are resistance-welded to a safety valve mechanism 512 and the bottom of the battery can 502, respectively. The safety valve mechanism 512 is electrically connected to the positive electrode cap 501 through a positive temperature coefficient (PTC) element 511. The safety valve mechanism 512 cuts off electrical connection between the positive electrode cap 501 and the positive electrode 504 when the internal pressure of the battery exceeds a predetermined threshold value. Further, the PTC element 511, which serves as a thermally sensitive resistive element whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in this embodiment, the coin-type lithium-ion battery, the laminated lithium-ion battery, and the cylindrical lithium-ion battery are given as examples of the lithium-ion battery; however, any of lithium-ion batteries with a variety of shapes, such as a sealed lithium-ion battery and a square-type lithium-ion battery, can be used. Further, a structure in which a plurality of positive electrodes, a plurality of negative electrodes, and a plurality of separators are stacked or wound may be employed.

As the negative electrodes of the lithium-ion battery 300, the lithium-ion battery 400, and the lithium-ion battery 500, which are described in this embodiment, the negative electrode for a power storage device of one embodiment of the present invention are used. Thus, the lithium-ion batteries 300, 400, and 500 can have favorable long-term cycle performance.

This embodiment can be implemented in combination with any of the other embodiments and examples as appropriate.

(Embodiment 4)

In this embodiment, a lithium-ion capacitor will be described as a power storage device.

A lithium-ion capacitor is a hybrid capacitor including a combination of a positive electrode of an electric double layer capacitor (EDLC) and a negative electrode of a lithium-ion secondary battery formed using a carbon material and is also an asymmetric capacitor where power storage principles of the positive electrode and the negative electrode are different from each other. The positive electrode enables charge and discharge by adsorption and desorption of charge carrying ions across electrical double layers as in the "electric double layer capacitor", whereas the negative electrode enables charge and discharge by the redox reaction as in the "lithium-ion battery". A negative electrode in which lithium is received in a negative electrode active material such as a carbon material is used, whereby energy density is much higher than that of a conventional electric double layer capacitor whose negative electrode is formed using porous activated carbon.

In a lithium-ion capacitor, instead of the positive electrode active material layer in the lithium-ion battery described in Embodiment 3, a material capable of reversibly having at least one of lithium ions and anions is used. Examples of such a material include active carbon, a conductive polymer, and a polyacenic semiconductor (PAS).

The lithium-ion capacitor has high charge and discharge efficiency which allows rapid charge and discharge and has a long life even when it is repeatedly used.

As the negative electrode of such a lithium-ion capacitor, the electrode for a power storage device which is described in the above embodiment is used. Thus, the decomposition reaction of an electrolytic solution and the like as a side reaction of charge and discharge can be minimized and therefore, a power storage device having long-term cycle performance can be manufactured.

This embodiment can be implemented in combination with any of the other embodiments and examples as appropriate.

(Embodiment 5)

The power storage device of one embodiment of the present invention can be used for power supplies of a variety of electric appliances which can be operated with electric power.

Specific examples of electrical appliances each utilizing the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, mobile phones, car phones, portable game machines, calculators, portable information terminals, electronic notebooks, e-book readers, electronic translators, audio input devices, video cameras, toys, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools such as chain saws, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the lithium secondary batteries are also included in the category of electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electrical devices, the power storage device of one embodiment of the present invention can be used as a main power supply for supplying enough electric power for almost the whole power consumption. Alternatively, in the electrical devices, the power storage device of one embodiment of the present invention can be used as an uninterruptible power supply which can supply electric power to the electrical devices when the supply of electric power from the main power supply or a commercial power supply is stopped. Still alternatively, in the electrical devices, the power storage device of one embodiment of the present invention can be used as an auxiliary power supply for supplying electric power to the electrical devices at the same time as the power supply from the main power supply or a commercial power supply.

Figure 8:
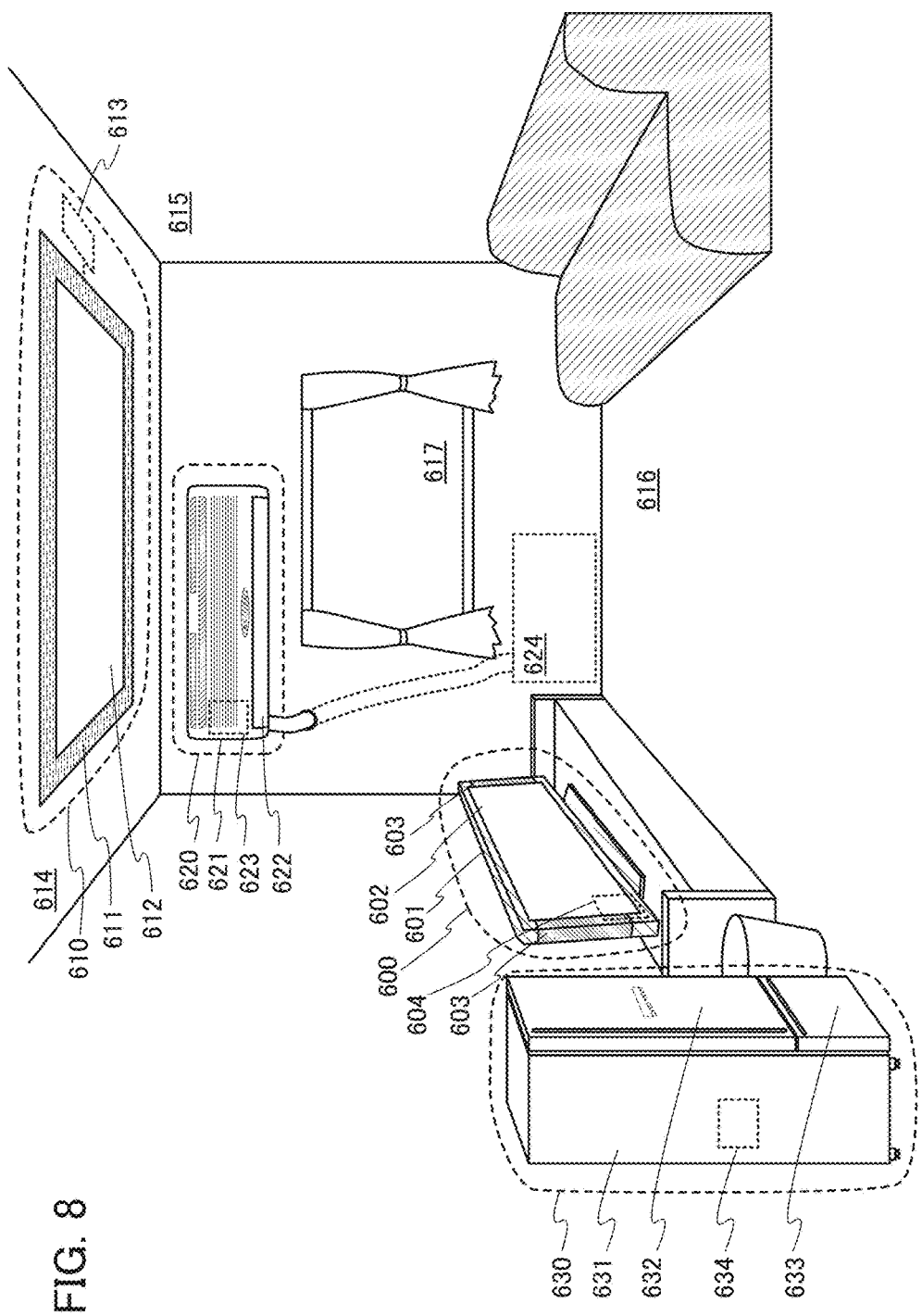
FIG. 8 illustrates electronic devices.

FIG. 8 illustrates specific structures of the electrical devices. In FIG. 8, a display device 600 is an example of an electrical device including a power storage device 604 of one embodiment of the present invention. Specifically, the display device 600 corresponds to a display device for TV broadcast reception and includes a housing 601, a display portion 602, speaker portions 603, and the power storage device 604. The power storage device 604 of one embodiment of the present invention is provided in the housing 601. The display device 600 can receive electric power from a commercial power supply. Alternatively, the display device 600 can use electric power stored in the power storage device 604. Thus, the display device 600 can be operated with the use of the power storage device 604 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 602.

Note that the display device includes, in its category, all of information display devices for personal computers, advertisement displays, and the like besides TV broadcast reception.

In FIG. 8, an installation lighting device 610 is an example of an electrical device including a power storage device 613 of one embodiment of the present invention. Specifically, the lighting device 610 includes a housing 611, a light source 612, and a power storage device 613. Although FIG. 8 illustrates the case where the power storage device 613 is provided in a ceiling 614 on which the housing 611 and the light source 612 are installed, the power storage device 613 may be provided in the housing 611. The lighting device 610 can receive electric power from a commercial power supply. Alternatively, the lighting device 610 can use electric power stored in the power storage device 613. Thus, the lighting device 610 can be operated with the use of the power storage device 613 of one embodiment of the present invention as an uninterruptible power supply even when electric power cannot be supplied from a commercial power supply due to power failure or the like.

Note that although the installation lighting device 610 provided in the ceiling 614 is illustrated in FIG. 8 as an example, the power storage device of one embodiment of the present invention can be used in an installation lighting device provided in, for example, a wall 615, a floor 616, a window 617, or the like other than the ceiling 614. Alternatively, the power storage device can be used in a tabletop lighting device or the like.

As the light source 612, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 8, an air conditioner including an indoor unit 620 and an outdoor unit 624 is an example of an electrical device including a power storage device 623 of one embodiment of the invention. Specifically, the indoor unit 620 includes a housing 621, an air outlet 622, and a power storage device 623. Although FIG. 8 illustrates the case where the power storage device 623 is provided in the indoor unit 620, the power storage device 623 may be provided in the outdoor unit 624. Alternatively, the secondary batteries 623 may be provided in both the indoor unit 620 and the outdoor unit 624. The air conditioner can receive electric power from a commercial power supply. Alternatively, the air conditioner can use electric power stored in the power storage device 623. Particularly in the case where the secondary batteries 623 are provided in both the indoor unit 620 and the outdoor unit 624, the air conditioner can be operated with the use of the power storage device 623 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 8 as an example, the power storage device of one embodiment of the present invention can be used in an air conditioner in which the functions of an indoor unit and an outdoor unit are integrated in one housing.

In FIG. 8, an electric refrigerator-freezer 630 is an example of an electrical device including a power storage device 634 of one embodiment of the present invention. Specifically, the electric refrigerator-freezer 630 includes a housing 631, a door for a refrigerator 632, a door for a freezer 633, and the power storage device 634. The power storage device 634 is provided in the housing 631 in FIG. 8. The electric refrigerator-freezer 630 can receive electric power from a commercial power supply. Alternatively, the electric refrigerator-freezer 630 can use electric power stored in the power storage device 634. Thus, the electric refrigerator-freezer 630 can be operated with the use of the power storage device 634 of one embodiment of the present invention as an uninterruptible power supply even when electric power cannot be supplied from a commercial power supply due to power failure or the like.

Note that among the electrical devices described above, a high-frequency heating apparatus such as a microwave oven and an electrical device such as an electric rice cooker require high power in a short time. The tripping of a breaker of a commercial power supply in use of an electrical device can be prevented by using the power storage device of one embodiment of the present invention as an auxiliary power supply for supplying electric power which cannot be supplied enough by a commercial power supply.

In addition, in a time period when electrical devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electrical devices are used. For example, in the case of the electric refrigerator-freezer 630, electric power can be stored in the power storage device 634 in night time when the temperature is low and the door for a refrigerator 632 and the door for a freezer 633 are not often opened or closed. On the other hand, in daytime when the temperature is high and the door for a refrigerator 632 and the door for a freezer 633 are frequently opened and closed, the power storage device 634 is used as an auxiliary power supply; thus, the usage rate of electric power in daytime can be reduced.

This embodiment can be implemented in combination with any of the other embodiments as appropriate.

(Embodiment 6)

Next, a portable information terminal which is an example of electrical devices will be described with reference to FIGS. 9A to 9C.

Figure 9A:
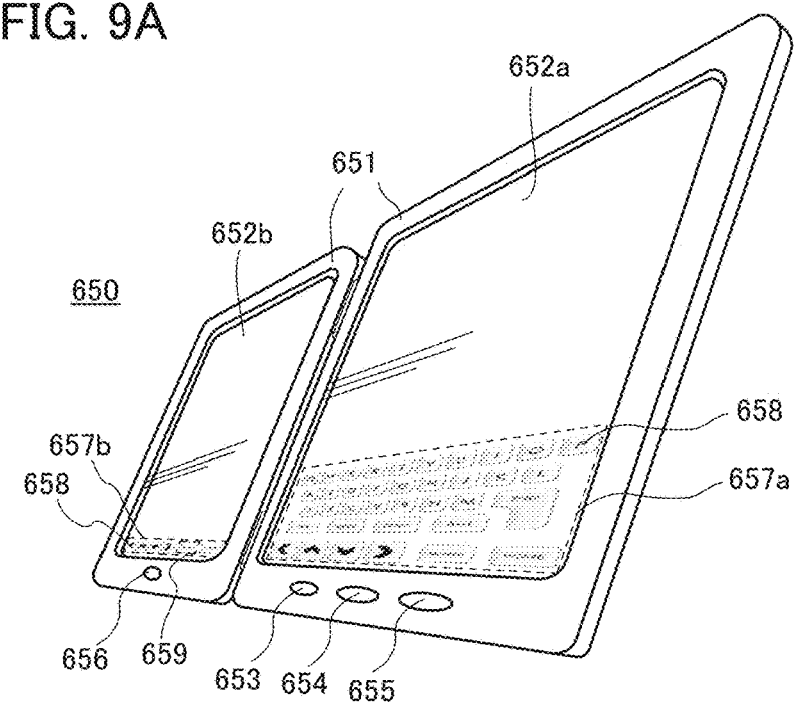
FIGS. 9A to 9C illustrate an electronic device.
Figure 9B:
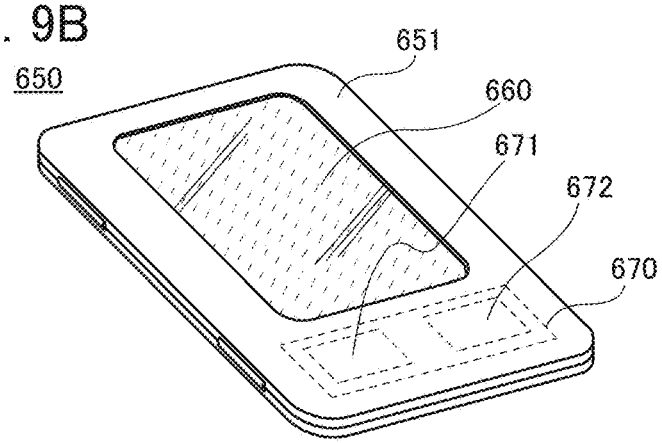

FIGS. 9A and 9B illustrate a tablet terminal 650 which can be folded. FIG. 9A illustrates the tablet terminal 650 in the state of being unfolded. The tablet terminal includes a housing 651, a display portion 652a, a display portion 652b, a display-mode switching button 653, a power button 654, a power-saving-mode switching button 655, and an operation button 656.

A touch panel area 657a can be provided in part of the display portion 652a, in which area, data can be input by touching displayed operation keys 658. Note that half of the display portion 652a has only a display function and the other half has a touch panel function. However, the structure of the display portion 652a is not limited to this, and all the area of the display portion 652a may have a touch panel function. For example, a keyboard can be displayed on the whole display portion 652a to be used as a touch panel, and the display portion 652b can be used as a display screen.

A touch panel area 657b can be provided in part of the display portion 652b like in the display portion 652a. When a keyboard display switching button 659 displayed on the touch panel is touched with a finger, a stylus, or the like, a keyboard can be displayed on the display portion 652b.

The touch panel area 657a and the touch panel area 657b can be controlled by touch input at the same time.

The display-mode switching button 653 allows switching between a landscape mode and a portrait mode, color display and black-and-white display, and the like. The power-saving-mode switching button 655 allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Although the display area of the display portion 652a is the same as that of the display portion 652b in FIG. 9A, one embodiment of the present invention is not particularly limited thereto. The display area of the display portion 652a may be different from that of the display portion 652b, and further, the display quality of the display portion 652a may be different from that of the display portion 652b. For example, one of the display portions 652a and 652b may display higher definition images than the other.

FIG. 9B illustrates the tablet terminal 650 in the state of being closed. The tablet terminal 650 includes the housing 651, a solar cell 660, a charge and discharge control circuit 670, a battery 671, and a DC-DC converter 672. FIG. 9B illustrates an example where the charge and discharge control circuit 670 includes the battery 671 and the DC-DC converter 672. The power storage device of one embodiment of the present invention, which is described in the above embodiment, is used as the battery 671.

Since the tablet terminal 650 can be folded, the housing 651 can be closed when the tablet terminal is not in use. Thus, the display portions 652a and 652b can be protected, which permits the tablet terminal 650 to have high durability and improved reliability for long-term use.

The tablet terminal illustrated in FIGS. 9A and 9B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 660, which is attached on a surface of the tablet terminal, can supply electric power to a touch panel, a display portion, an image signal processor, and the like. Note that the solar cell 660 can be provided on one or both surfaces of the housing 651 and thus the battery 671 can be charged efficiently. The use of the power storage device of one embodiment of the present invention as the battery 671 has advantages such as a reduction in size.

The structure and operation of the charge and discharge control circuit 670 illustrated in FIG. 9B will be described with reference to a block diagram of FIG. 9C. FIG. 9C illustrates the solar cell 660, the battery 671, the DC-DC converter 672, a converter 673, switches SW1 to SW3, and a display portion 652. The battery 671, the DC-DC converter 672, the converter 673, and the switches SW1 to SW3 correspond to the charge and discharge control circuit 670 in FIG. 9B.

First, an example of operation in the case where electric power is generated by the solar cell 660 using external light will be described. The voltage of electric power generated by the solar cell is raised or lowered by the DC-DC converter 672 so that the electric power has a voltage for charging the battery 671. When the display portion 652 is operated with the electric power from the solar cell 660, the switch SW1 is turned on and the voltage of the electric power is raised or lowered by the converter 673 to a voltage needed for operating the display portion 652. In addition, when display on the display portion 652 is not performed, the switch SW1 is turned off and the switch SW2 is turned on so that the battery 671 may be charged.

Although the solar cell 660 is described as an example of a power generation means, there is no particular limitation on the power generation means, and the battery 671 may be charged with any of the other means such as a piezoelectric element or a thermoelectric conversion element (Peltier element). For example, the battery 671 may be charged with a non-contact power transmission module capable of performing charging by transmitting and receiving electric power wirelessly (without contact), or any of the other charge means used in combination.

Figure 9C:
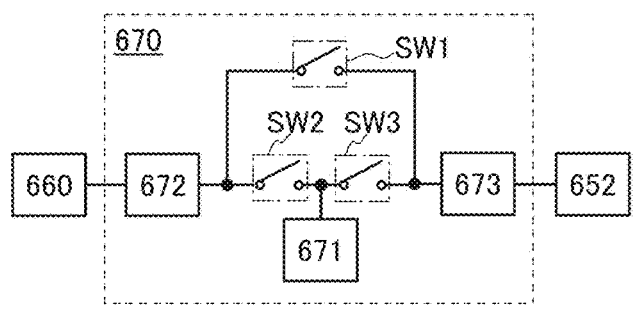

It is needless to say that one embodiment of the present invention is not limited to the electrical device illustrated in FIGS. 9A to 9C as long as the power storage device described in the above embodiment is included.

(Embodiment 7)

Further, an example of the moving object which is an example of the electrical devices will be described with reference to FIGS. 10A and 10B.

The power storage device described in the above embodiment can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 10A:
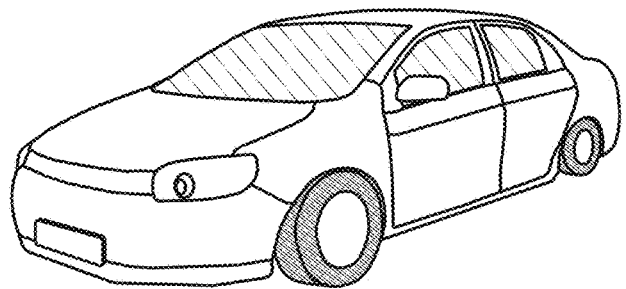
FIGS. 10A and 10B illustrate an electronic device of the present invention.
Figure 10B:
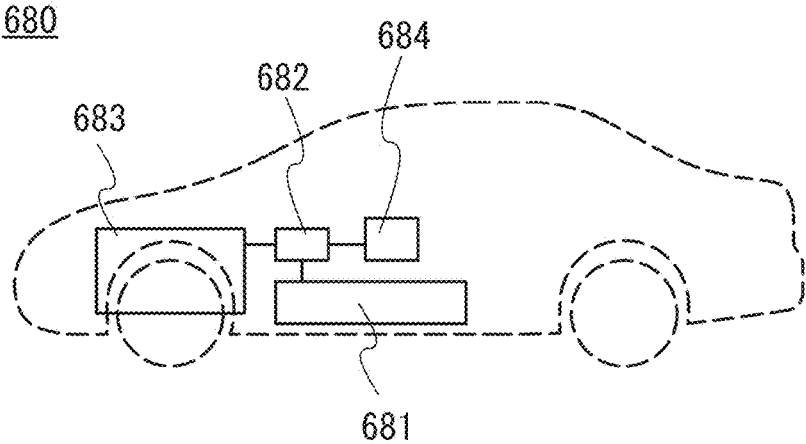

FIGS. 10A and 10B illustrate an example of an electric vehicle. An electric vehicle 680 is equipped with a battery 681. The output of the electric power of the battery 681 is adjusted by a control circuit 682 and the electric power is supplied to a driving device 683. The control circuit 682 is controlled by a processing unit 684 including a ROM, a RAM, a CPU, or the like which is not illustrated.

The driving device 683 includes a DC motor or an AC motor either alone or in combination with an internal-combustion engine. The processing unit 684 outputs a control signal to the control circuit 682 based on input data such as data on operation (e.g., acceleration, deceleration, or stop) of a driver or data during driving (e.g., data on an upgrade or a downgrade, or data on a load on a driving wheel) of the electric vehicle 680. The control circuit 682 adjusts the electric energy supplied from the battery 681 in accordance with the control signal of the processing unit 684 to control the output of the driving device 683. In the case where the AC motor is mounted, although not illustrated, an inverter which converts direct current into alternate current is also incorporated.

The battery 681 can be charged by external electric power supply using a plug-in technique. For example, the battery 681 is charged through a power plug from a commercial power supply. The battery 681 can be charged by converting the supplied power into DC constant voltage having a predetermined voltage level through a converter such as an AC-DC converter. The use of the power storage device of one embodiment of the present invention as the battery 681 can be conducive to an increase in battery capacity, leading to an improvement in convenience. When the battery 681 itself can be more compact and more lightweight as a result of improved characteristics of the battery 681, the vehicle can be lightweight, leading to an increase in fuel efficiency.

Note that it is needless to say that one embodiment of the present invention is not limited to the electrical device described above as long as the power storage device of one embodiment of the present invention is included.

This embodiment can be implemented in combination with any of the other embodiments and the example as appropriate.

EXAMPLE 1

The present invention will be described in detail below with examples. Note that the present invention is not limited to the examples below.

(Formation of Negative Electrode)

First, a method for forming an electrode used in this example will be described.

First, graphite produced by JFE Chemical Corporation was used as an active material and PVDF was used as a binder to form a slurry in which the weight ratio of the graphite to the PVDF is 90:10. As a solvent of the slurry, NMP was used.

Copper foil was used as a current collector. The slurry containing the graphite was applied to the current collector, dried at 70° C., and then dried at 170° C. in a vacuum atmosphere for 10 hours. In the above manner, an active material layer containing graphite was formed.

Then, the active material layer was soaked in a treatment liquid used to form a film on the active material for ten minutes. The treatment liquid contains 2 wt % of an organosilicon compound containing ethyl polysilicate as a main component, 97.8 wt % of ethanol, 0.2 wt % of water, and $4 \times 10^{-4}$ wt % of hydrochloric acid. In the case of this compounding ratio, the proportion of silicon oxide in the treatment liquid is 0.8 wt % of the weight of the treatment liquid.

After that, heat treatment was performed on the active material layer on a hot plate at 70° C. for an hour, whereby ethyl silicate contained in the treatment liquid reacted with moisture in the air, so that hydrolysis occurred, and the ethyl silicate after the hydrolysis was condensed by dehydration reaction following the hydrolysis reaction. In the above manner, the active material layer was covered with silicon oxide.

Through the above steps, Electrode A was formed.

Next, a method for forming Comparative Electrode B will be described. Comparative Electrode B was formed by forming a film on graphite in advance by a sol-gel method and then forming an active material layer.

In the case of Comparative Electrode B, graphite used as an active material was covered with silicon oxide by a sol-gel method. As the graphite, graphite produced by JFE Chemical Corporation was used.

First, silicon ethoxide, ethyl acetoacetate, and toluene were mixed and stirred to form a $Si(OEt)_4$ toluene solution. At this time, the amount of the silicon ethoxide was determined so that the weight ratio of silicon oxide formed later to graphite was 1 wt % (weight percent). The compounding ratio of this solution was as follows: the $Si(OEt)_4$ was $3.14 \times 10^{-4}$ mol; the ethyl acetoacetate, $6.28 \times 10^{-4}$ mol; and the toluene, 2 ml.

Next, the $Si(OEt)_4$ toluene solution to which graphite was added was stirred in a dry room. Then, the solution was held at 70° C. in a humid environment for 3 hours so that the $Si(OEt)_4$ in the $Si(OEt)_4$ toluene solution to which the graphite was added was hydrolyzed and condensed. In other words, the $Si(OEt)_4$ in the solution gradually reacted with moisture in the air, so that hydrolysis reaction gradually occurred, and the $Si(OEt)_4$ after the hydrolysis was condensed by dehydration reaction following the hydrolysis reaction. In such a manner, gelled silicon was attached to the surfaces of graphite particles to form a net-like structure of a C—O—Si bond.

Then, baking was performed at 500° C. in a nitrogen atmosphere for three hours, whereby graphite covered with silicon oxide was formed. Further, the graphite covered with silicon oxide and PVDF were mixed to form a slurry, and the slurry was applied to a current collector and dried, so that Comparative Electrode B was formed. In this case, the weight ratio of the graphite to the PVDF was 90:10.

Comparative Electrode C was formed using an active material not covered with silicon oxide. In the case of Comparative Electrode C, graphite produced by JFE Chemical Corporation was used as an active material and PVDF was used as a binder to form a slurry in which the ratio of the graphite to the PVDF is 90:10. As a solvent of the slurry, NMP was used.

Copper foil was used as a current collector. The slurry containing the graphite was applied to the current collector, dried at 70° C., and then dried at 170° C. in a vacuum atmosphere for 10 hours. In the above manner, an active material layer containing graphite was formed.

Through the above steps, Comparative Electrode C was formed.

(Evaluation of Degree of Graphitization)

Next, Raman spectra obtained by Raman spectroscopy measurement on graphites in Electrode A, Comparative Electrode B, and Comparative Electrode C will be described. Three-point measurement was performed on each of Electrode A, Comparative Electrode B, and Comparative Electrode C using a PL microscope LabRAM manufactured by HORIBA, Ltd.

Figure 11:
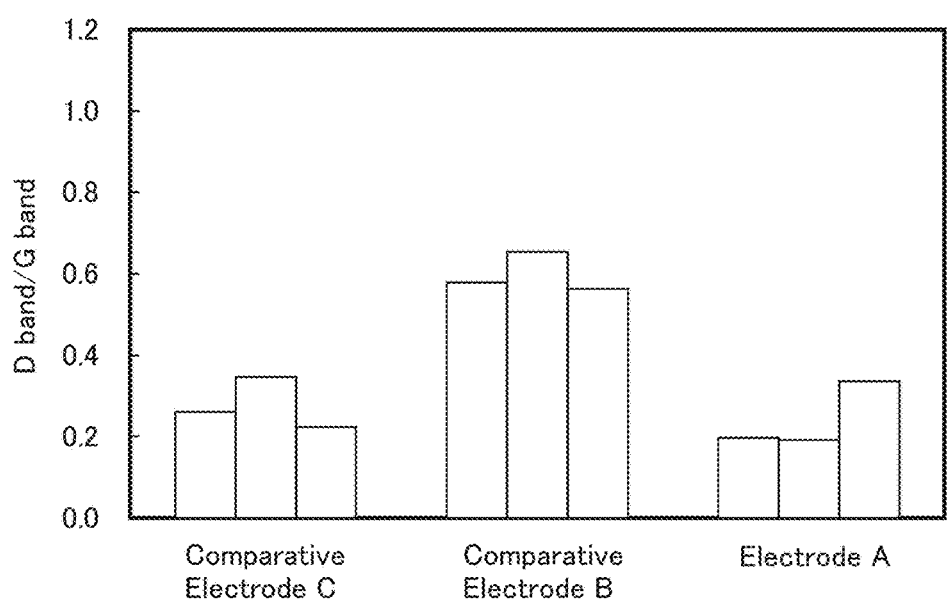
FIG. 11 shows the ratios of the D band to the G band of each of Electrode A, Comparative Electrode B, and Comparative Electrode C.

FIG. 11 shows the peak intensity ratios of D band to G band of each of graphites in Electrode A, Comparative Electrode B, and Comparative Electrode C. "D band" is a peak around 1360 $cm^{-1}$ in Raman spectrum, and "G band" is a peak around 1580 $cm^{-1}$ in Raman spectrum. As shown in FIG. 11, the peak intensity ratio of D band to G band (D band/G band) of graphite in Electrode A and the peak intensity ratio of D band to G band of graphite in Comparative Electrode C are each approximately 0.3. On the other hand, the peak intensity ratio of D band to G band of graphite in Comparative Electrode B is approximately 0.6.

According to the results in FIG. 11, the degree of graphitization of graphite in Electrode A was comparable to that of graphite in Comparative Electrode C, and the degree of graphitization of graphite in Comparative Electrode B was lower than that of graphite in Electrode A. The results in FIG. 11 suggest that the degree of graphitization of graphite in Comparative Electrode B was decreased in the process where graphite was covered with silicon oxide. Thus, Electrode A probably has less factors of a decrease in the degree of graphitization in the process where graphite is covered with silicon oxide than Comparative Electrode B.

In the method for forming Comparative Electrode B in which graphite particles are covered with silicon oxide in advance by a sol-gel method, a graphite particle was damaged by hydrolysis reaction, leading to lower crystallinity. In contrast, in the method for forming Electrode A in which graphite particles are covered with silicon oxide after formation of a coated electrode, it is presumable that the number of contact points between the graphite particles and silicon oxide was reduced in hydrolysis reaction (because there are a portion coated with a binder and a contact point between graphite particles) and thus damage to the graphite particles was inhibited, resulting in suppression of a reduction in the crystallinity of the graphite particles.

(Evaluation of Initial Irreversible Capacity of Half Cell)

Next, half cells including Electrode A, Comparative Electrode B, and Comparative Electrode C were fabricated. Measurement results of the initial irreversible capacities of the half cells are as follows.

Figure 12:
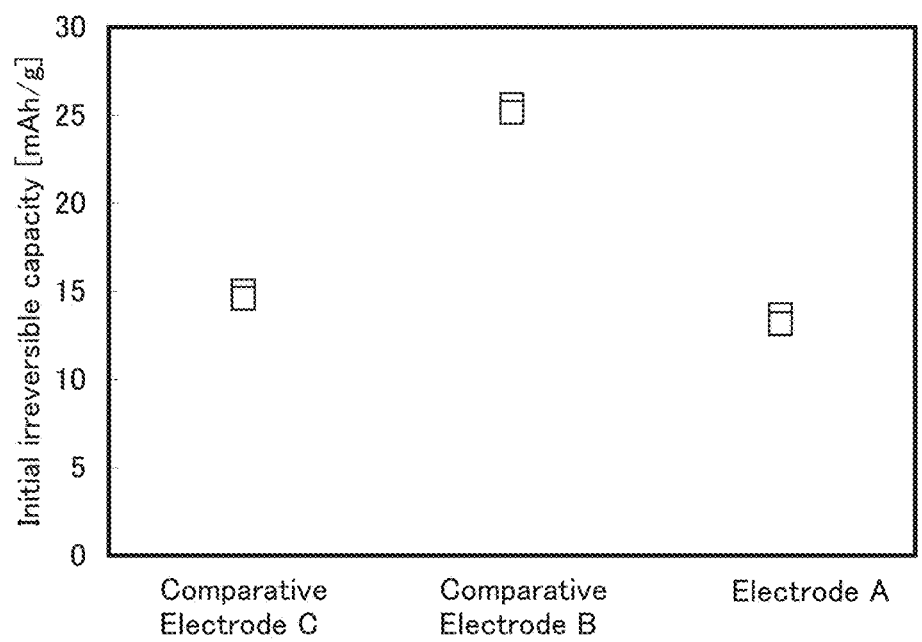
FIG. 12 shows initial irreversible capacities.

The performance was evaluated using coin cells. Electrode A, Comparative Electrode B, or Comparative Electrode C was used as a positive electrode; a lithium metal was used as a negative electrode; polypropylene (PP) was used as a separator; and an electrolytic solution formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1 was used. Two half cells including Electrodes A, two half cells including Comparative Electrodes B, and two half cells including Comparative Electrodes C were fabricated. Discharging was performed in such a manner that capacity of 200 mAh/g was discharged at a constant current and a rate of 0.2 C (it takes five hours for discharging). Charging was performed at a rate of 0.2 C (it takes five hours for charging) until the voltage reached a termination voltage of 1 V. The environmental temperature was set to 25° C. Under such conditions, the measurements were performed. FIG. 12 shows the difference between discharge capacity and charge capacity as irreversible capacity.

The results in FIG. 12 indicate that the irreversible capacity of Electrode A was lower than that of Comparative Electrode B. This is probably because since the degree of graphitization of Electrode A is higher than that of Comparative Electrode B, the amount of Li inserted into low crystalline carbon, which requires a high potential for release of Li, was smaller. The results also indicate that the irreversible capacity of Electrode A was lower than that of Comparative Electrode C. This is probably because the decomposition of the electrolytic solution was inhibited by silicon oxide covering the surfaces of graphite.

Thus, in Electrode A, the graphite active material was able to be covered with silicon oxide while the degree of graphitization of the graphite active material was maintained, so that the irreversible capacity was able to be reduced.

(Evaluation of Cycle Performance)

A full cell including Electrode A as a negative electrode, an electrolytic solution, and a positive electrode was fabricated and charged and discharged once, whereby Lithium-ion Secondary Battery A was fabricated. Then, the cycle performance of the secondary battery was measured. In a similar manner, full cells including Comparative Electrode B/Comparative Electrode C as a negative electrode, an electrolytic solution, and a positive electrode were fabricated and charged and discharged once, whereby Lithium-ion Secondary Battery B and Lithium-ion Secondary Battery C were fabricated.

The performance was measured using coin cells. An electrode including LiFePO4 as an active material was used as a positive electrode; polypropylene (PP) was used as a separator; and an electrolytic solution formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1 was used. Charge and discharge in the first cycle were performed at a rate of 0.2 C (it takes five hours for charge), and charge and discharge in the second and the subsequent cycles were performed at a rate of 1 C (it takes an hour for charge). In every 200 cycles, charge and discharge were performed at a rate of 0.2 C (it takes 5 hours for charge) to measure discharge capacity.

Constant current charging and discharging were performed at voltages ranging from 2 V to 4 V and an environmental temperature of 60° C. Under such conditions, the measurements were performed.

Figure 13:
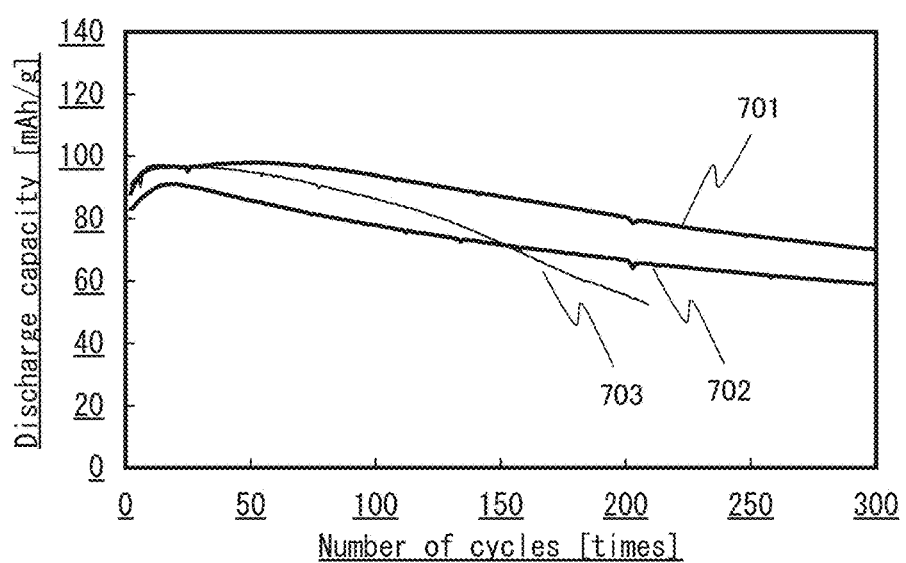
FIG. 13 shows cycle performance.

FIG. 13 shows the measurement results of cycle performance. The horizontal axis represents the number of cycles (times) and the vertical axis represents discharge capacity (mAh/g) of the secondary batteries. In FIG. 13, a curve 701 shows the cycle performance of Lithium-ion Secondary Battery A; a curve 702 shows the cycle performance of Lithium-ion Secondary Battery B; and a curve 703 shows the cycle performance of Lithium-ion Secondary Battery C.

As shown by the curve 703 in the measurement results, in the case of the lithium-ion secondary battery including a negative electrode active material layer where graphite particles are not covered with a silicon oxide film, the discharge capacity was decreased as the number of cycles increased. That is to say, degradation was significant.

In contrast, as shown by the curves 701 and 702, in the case of the lithium-ion secondary batteries in each of which graphite was provided with a silicon oxide film, although the discharge capacity had a tendency to be reduced, the reduction was not significant compared with that in the case of the lithium-ion secondary battery where graphite was not provided with a silicon oxide film, which indicates that degradation was sufficiently inhibited.

Further, comparison between the curve 701 and the curve 702 shows that the cycle performance of Lithium-ion Secondary battery A was better than that of Lithium-ion Secondary Battery B.

The results shown in FIG. 13 suggest that the electrochemical deposition of the electrolytic solution and the like in Electrode A was able to be minimized because the surface of graphite was partly or entirely covered with silicon oxide and thus was stabilized and that in Lithium-ion Secondary Battery A including Electrode A, generation of other passivating films on repeated charge and discharge was inhibited, leading to an improvement in cycle performance.

(Observation of Electrode A with Electron Microscope)

Figure 14A:
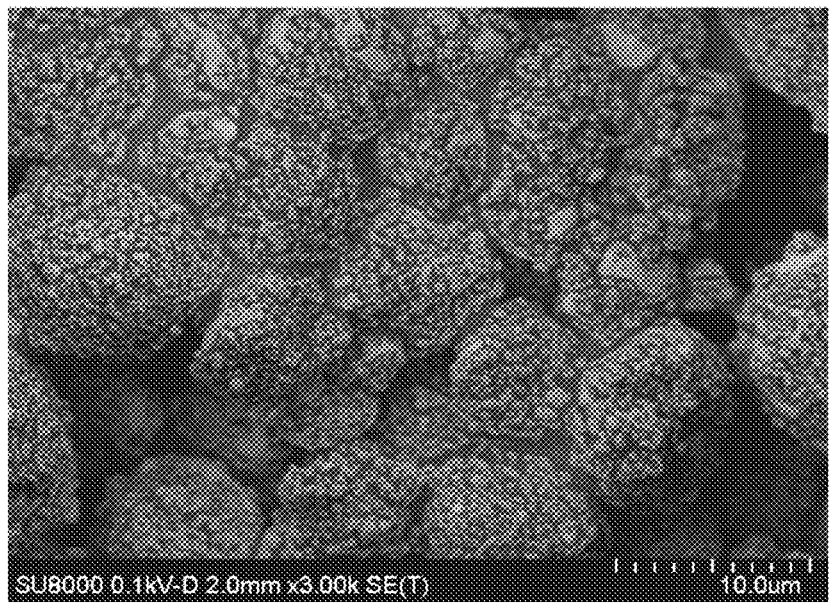
FIGS. 14A and 14B are SEM images.
Figure 14B:
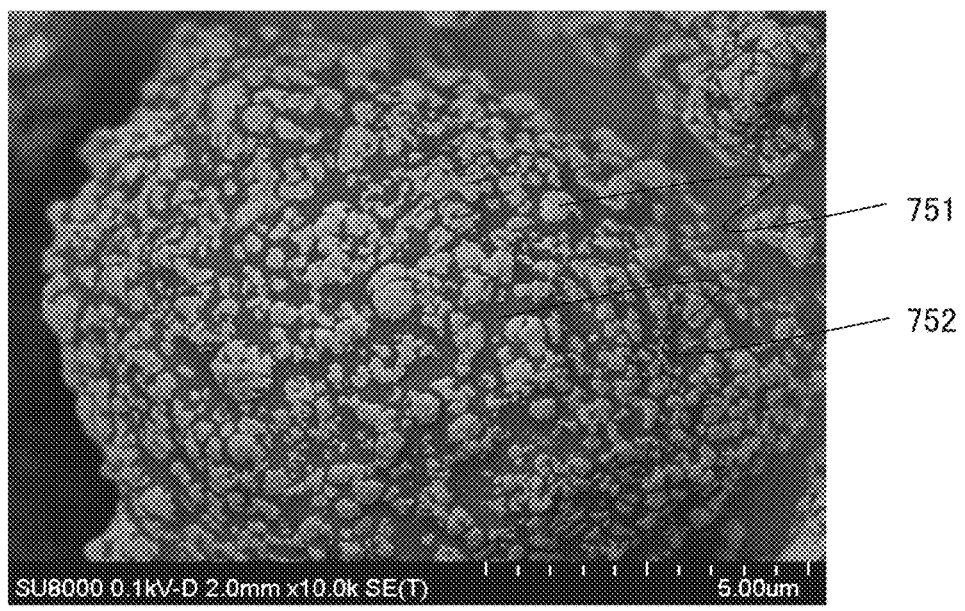

FIGS. 14A and 14B show images of Electrode A observed with a scanning electron microscope (SEM). FIGS. 14A and 14B are SEM images of graphite partly provided with a silicon oxide film. FIG. 14B is the enlarged SEM image of a part of the SEM image in FIG. 14A. Observation was performed at a low acceleration voltage of 0.1 kV by a retarding method using a top detector. As shown in FIGS. 14A and 14B, a formation region of silicon oxide appears dark gray, and the surface of graphite appears light gray or white.

FIG. 14A shows the state where graphite particles each having a diameter of approximately 10 μm were provided over a current collector to serve as a mixture electrode.

In FIG. 14B, a graphite particle 751 is shown by light gray, and a dark gray region in the surface of the graphite particle is a portion where a silicon oxide film 752 was formed. Thus, a difference in contrast in the SEM image makes it possible to distinguish the formation region of the silicon oxide film from other regions. The silicon oxide film not completely covering the surface of the graphite particle but partly covering the surface was observed.

As described above, the result of observation with SEM shows how the silicon oxide films were formed on the surfaces of the graphite particles.

(Evaluation)

According to the above results, the use of the electrode of one embodiment of the present invention in the lithium-ion battery enabled a reduction in the initial irreversible capacity of the lithium-ion battery. Further, the decomposition reaction of the electrolytic solution as a side reaction of charge and discharge was minimized on repeated charge and discharge of the lithium-ion battery, resulting in an improvement in the cycle performance of the lithium-ion battery.

EXAMPLE 2

In this example, evaluation results of the cycle performance of a lithium-ion secondary battery including the electrode of one embodiment of the present invention will be described.

First, a method for forming an electrode used as a negative electrode will be described.

First, graphite produced by JFE Chemical Corporation was used as an active material and PVDF was used as a binder to form a slurry in which the weight ratio of the graphite to the PVDF is 90:10. As a solvent of the slurry, NMP was used.

Copper foil was used as a current collector. The slurry containing the graphite was applied to the current collector, dried at 70° C., and then dried at 170° C. in a vacuum atmosphere for 10 hours. In the above manner, an active material layer containing graphite was formed.

Next, punching was performed on the current collector provided with the active material layer to obtain round shapes, so that Comparative Electrode D1 and Comparative Electrode D2 were formed.

In addition, Comparative Electrodes E1 to E4 and Comparative Electrodes F1 to F4, which are different from Comparative Electrodes D1 and D2, were formed.

First, silicon ethoxide, ethyl acetoacetate, and toluene were mixed and stirred to form a $Si(OEt)_4$ toluene solution. The compounding ratio of this solution was as follows: the $Si(OEt)_4$ was $3.14 \times 10^{-4}$ mol; the ethyl acetoacetate, $6.28 \times 10^{-4}$ mol; and the toluene, 2 ml. Note that two different amounts of the silicon ethoxide were determined so that the weight ratios of silicon oxide formed later to graphite were 1 wt % and 3 wt %.

Next, the $Si(OEt)_4$ toluene solution to which graphite was added was stirred in a dry room. Then, the solution was held at 70° C. in a humid environment for 3 hours so that the $Si(OEt)_4$ in the $Si(OEt)_4$ toluene solution to which the graphite was added was hydrolyzed and condensed. In other words, the $Si(OEt)_4$ in the solution reacted with moisture in the air, so that hydrolysis reaction gradually occurred, and the $Si(OEt)_4$ after the hydrolysis was condensed by dehydration reaction following the hydrolysis reaction. In such a manner, gelled silicon was attached to the surfaces of graphite particles to form a net-like structure of a C—O—Si bond.

Then, baking was performed at 500° C. in a nitrogen atmosphere for three hours, whereby three kinds of graphites covered with silicon oxide were formed.

The graphite covered with 1 wt % of silicon oxide and PVDF were mixed to form a slurry, and the slurry was applied to a current collector and dried, so that an active material layer was formed. In this case, the weight ratio of the graphite to the PVDF was 90:10. As a solvent of the slurry, NMP was used. Next, punching was performed on the current collector provided with the active material layer to obtain round shapes, so that Comparative Electrodes E1 to E4 were formed.

In addition, the graphite covered with 3 wt % of silicon oxide and PVDF were mixed to form a slurry, and the slurry was applied to a current collector and dried, so that an active material layer was formed. In this case, the weight ratio of the graphite to the PVDF was 90:10. As a solvent of the slurry, NMP was used. Next, punching was performed on the current collector provided with the active material layer to obtain round shapes, so that Comparative Electrodes F1 to F4 were formed.

Comparative Electrodes E4 and F4 were formed to be observed with an electron microscope.

In addition, Comparative Electrodes H1 to H3, which are different from the above comparative electrodes, were formed.

First, silicon ethoxide, ethyl acetoacetate, and toluene were mixed and stirred to form a $Si(OEt)_4$ toluene solution. At this time, the amount of the silicon ethoxide was determined so that the weight ratio of silicon oxide formed later to graphite was 3 wt % (weight percent). The compounding ratio of this solution was as follows: the $Si(OEt)_4$ was $3.14 \times 10^{-4}$ mol; the ethyl acetoacetate, $6.28 \times 10^{-4}$ mol; and the toluene, 2 ml.

Next, the $Si(OEt)_4$ toluene solution to which graphite was added was stirred in a dry room. Then, the solution was held at 70° C. in a humid environment for 3 hours so that the $Si(OEt)_4$ in the $Si(OEt)_4$ toluene solution to which the graphite was added was hydrolyzed and condensed. In other words, the $Si(OEt)_4$ in the solution gradually reacted with moisture in the air, so that hydrolysis reaction gradually occurred, and the $Si(OEt)_4$ after the hydrolysis was condensed by dehydration reaction following the hydrolysis reaction. In such a manner, gelled silicon was attached to the surfaces of graphite particles to form a net-like structure of a C—O—Si bond.

Then, baking was performed at 500° C. in a nitrogen atmosphere for three hours, whereby graphite covered with silicon oxide was formed.

The graphite covered with 3 wt % of silicon oxide, PVDF, and acetylene black (AB) were mixed to form a slurry, and the slurry was applied to a current collector and dried, so that an active material layer was formed. In this case, the weight ratio of the graphite to the PVDF and the AB was 88:10:2. As a solvent of the slurry, NMP was used. Next, punching was performed on the current collector provided with the active material layer to obtain round shapes, so that Comparative Electrodes H1 to H3 were formed.

Then, the electrodes of this example were formed.

First, graphite produced by JFE Chemical Corporation was used as an active material and PVDF was used as a binder to form a slurry in which the weight ratio of the graphite to the PVDF is 90:10. As a solvent of the slurry, NMP was used.

Copper foil was used as a current collector. The slurry containing the graphite was applied to the current collector, dried at 70° C., and then dried at 170° C. in a vacuum atmosphere for 10 hours. In the above manner, an active material layer containing graphite was formed.

Then, the active material layer was soaked in a treatment liquid used to cover graphite with silicon oxide for ten minutes. The treatment liquid contains 2 wt % of an organosilicon compound containing ethyl polysilicate as a main component, 97.8 wt % of ethanol, 0.2 wt % of water, and $4 \times 10^{-4}$ wt % of hydrochloric acid. In the case of this compounding ratio, the proportion of silicon oxide in the treatment liquid is 0.8 wt % of the weight of the treatment liquid.

After that, heat treatment was performed on the active material layer on a hot plate at 70° C. for an hour, whereby ethyl silicate contained in the treatment liquid reacts with moisture in the air, so that hydrolysis occurred, and the ethyl silicate after the hydrolysis was condensed by dehydration reaction following the hydrolysis reaction. In the above manner, the surface of graphite in the active material layer was covered with silicon oxide.

Next, punching was performed on the current collector provided with the active material layer to obtain round shapes, so that Electrode I1 and Electrode I2 were formed.

Next, a full cell including Comparative Electrode D1 formed in the above steps as a negative electrode, an electrolytic solution, and a positive electrode was fabricated and charged and discharged once, whereby Lithium-ion Secondary Battery D1 was fabricated. Then, the cycle performance of the secondary battery was measured. In a similar manner, with the use of Comparative Electrode D2, Comparative Electrodes E1 to E3, Comparative Electrodes F1 to F3, Comparative Electrodes H1 to H3, and Electrodes I1 and I2, Lithium-ion Secondary Battery D2, Lithium-ion Secondary Batteries E1 to E3, Lithium-ion Secondary Batteries F1 to F3 Lithium-ion Secondary Batteries H1 to H3, and Lithium-ion Secondary Batteries I1 and I2 were fabricated. Then, the cycle performance of each of the lithium-ion secondary batteries was measured.

The performance was measured using coin cells. An electrode including $LiFePO_4$ as an active material was used as a positive electrode; polypropylene (PP) was used as a separator; and an electrolytic solution formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1 was used. Charging and discharging in the first cycle were performed at a rate of 0.2 C (it takes five hours for charging), and charge and discharge in the second and the subsequent cycles were performed at a rate of 1 C (it takes an hour for charging). In every 200 cycles, charge and discharge were performed at a rate of 0.2 C (it takes 5 hours for charging) to measure discharge capacity. Constant current charging and discharging were performed at voltages ranging from 2 V to 4 V and an environmental temperature of 60° C. Under such conditions, the measurements were performed.

Figure 15:
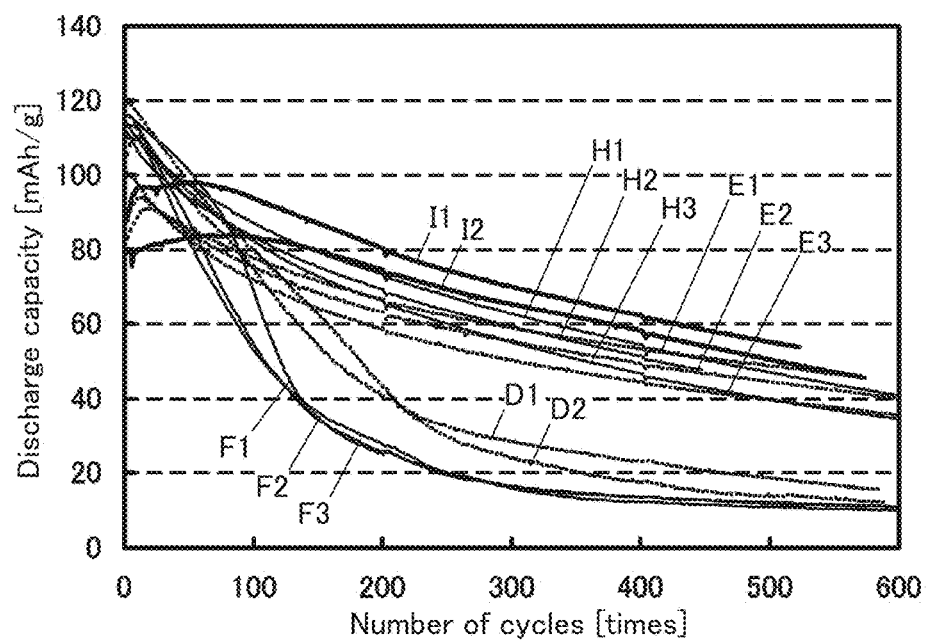
FIG. 15 shows cycle performance.

FIG. 15 shows the measurement results of cycle performance. The horizontal axis represents the number of cycles (times) and the vertical axis represents discharge capacity (mAh/g) of the secondary batteries.

As shown in FIG. 15, the discharge capacities of Lithium-ion Secondary Batteries F1 to F3 each including an electrode which includes graphite covered with 3 wt % of silicon oxide and Lithium-ion Secondary Batteries D1 and D2 each including an electrode which includes graphite not covered with silicon oxide were significantly reduced as the number of cycles increased.

In contrast, the discharge capacities of Lithium-ion Secondary Batteries E1 to E3 each including an electrode which includes graphite covered with 1 wt % of silicon oxide, Lithium-ion Secondary Batteries H1 to H3 each including an electrode which includes graphite covered with 3 wt % of silicon oxide and AB, and Lithium-ion Secondary Batteries I1 and I2 each including an electrode which was obtained by forming an active material layer and then covering graphite with silicon oxide had tendencies to be reduced; however, the reduction was not significant, which indicates that degradation was sufficiently inhibited.

The cycle performances of Lithium-ion Secondary Batteries I1 and I2 were better than that of Lithium-ion Secondary Batteries E1 to E3 and Lithium-ion Secondary Batteries H1 to H3.

Table 1 shows average charge and discharge efficiencies and discharge capacity maintenance factors which are obtained from the results of FIG. 15. The average charge and discharge efficiencies shown in Table 1 are the average values of charge and discharge efficiencies of 500 cycles of the lithium-ion secondary batteries. The discharge capacity maintenance factor is the value obtained by dividing the discharge capacity of each lithium-ion secondary battery in the second cycle by the discharge capacity thereof after 500 cycles. The average charge and discharge efficiency and the discharge capacity maintenance factor of Lithium-ion Secondary Battery H3 were not able to be calculated because the measurement was stopped before completion of 500 cycles.

TABLE 1

| Lithium-ion Secondary Battery | Average Charge and Discharge Efficiency [%] | Discharge Capacity Maintenance Factor [%] |
|---|---|---|
| D1 | 99.52 | 17.89 |
| D2 | 99.44 | 11.68 |
| E1 | 99.77 | 58.88 |
| E2 | 99.72 | 39.51 |
| E3 | 99.75 | 50.50 |
| F1 | 99.45 | 10.21 |
| F2 | 99.35 | 9.90 |
| F3 | 99.40 | 10.38 |
| H1 | 99.77 | 41.59 |
| H2 | 99.68 | 35.04 |
| H3 | — | — |
| I1 | 99.80 | 62.67 |
| I2 | 99.75 | 63.72 |

As shown in Table 1, the discharge capacity maintenance factors of Lithium-ion Secondary Batteries D1 and D2 and Lithium-ion Secondary Batteries F1 to F3 were each less than 20%. Further, the discharge capacity maintenance factors of Lithium-ion Secondary Batteries I1 and I2 were higher than those of Lithium-ion Secondary Batteries E1 to E3, F1 to F3, and H1 and H2.

(Observation of Comparative Electrode E4 and Comparative Electrode F4 with Electron Microscope)

Figure 16A:
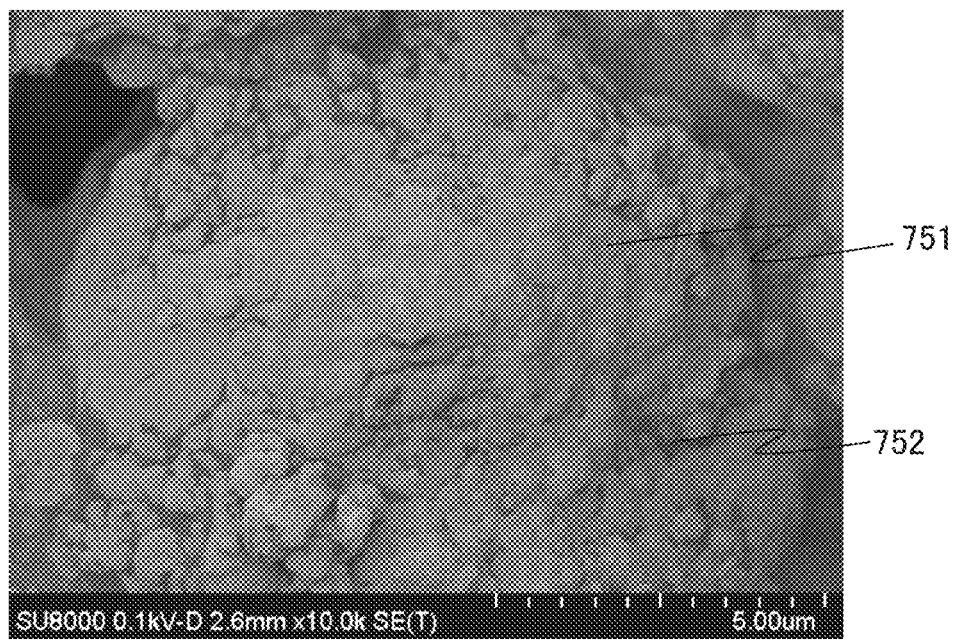
FIGS. 16A and 16B are SEM images.
Figure 16B:
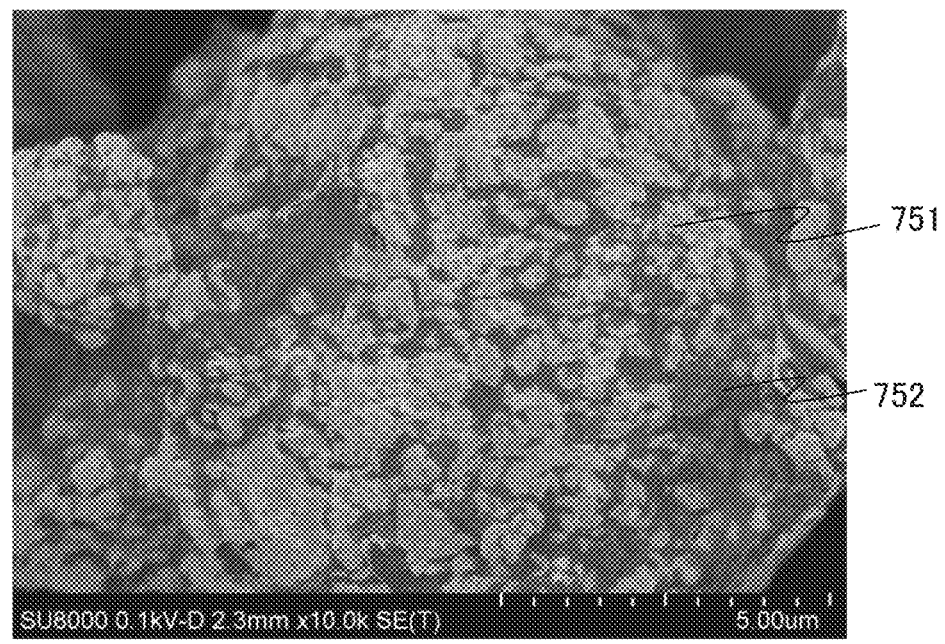

FIGS. 16A and 16B show SEM images of Comparative Electrode E4 and Comparative Electrode F4. FIG. 16A is the SEM image of Comparative Electrode E4 and FIG. 16B is the SEM image of Comparative Electrode F4. Note that the SEM image in FIG. 16A and the SEM image in FIG. 16B were observed under the same magnification.

In Comparative Electrode E4 in FIG. 16A, a slight amount of silicon oxide film 752 formed on the surface of the graphite particle 751 was observed.

In Comparative Electrode F4 in FIG. 16B, the silicon oxide film 752 having an area larger than that of Comparative Electrode E4 in FIG. 16A was observed.

However, according to the results of the cycle performance in FIG. 15, the cycle performances of Comparative Electrodes F1 to F3 formed in a manner similar to that of Comparative Electrode F4 was worse than those of Comparative Electrodes E1 to E3 formed in a manner similar to that of Comparative Electrode E4. The degradation in cycle characteristics is presumably due to contact between the graphite particles that is obstructed by the silicon oxide as in the model illustrated in FIG. 1C1, resulting in a reduction of graphite effectually serving as a negative electrode active material.

On the other hand, Electrode A in FIGS. 14A and 14B had a larger area where the silicon oxide covers the graphite than Comparative Electrodes E4 and F4. The cycle performances of Lithium-ion Secondary Batteries I1 and I2 including Electrodes I1 and I2 formed by a formation method similar to that of Electrode A were better than those of Lithium-ion Secondary Batteries E1 to E3 including Comparative Electrodes E1 to E3 and Lithium-ion Secondary Batteries F1 to F3 including Comparative Electrodes F1 to F3. This is presumably because the conductive path of electrons was able to be maintained by covering the coated electrode with the silicon oxide even in the case where the contact interface between the graphite and the electrolytic solution was covered with the film as in the model illustrated in FIG. 1C2.

The results in FIG. 15 and FIGS. 16A and 16B show that in the case where the electrode was formed after the graphite was covered with the silicon oxide by a sol-gel method, when the graphite particles were covered with a certain amount or more of silicon oxide, the cycle performance of the lithium-ion secondary battery was degraded. In contrast, in the case where the coated electrode was covered with the silicon oxide, even when the graphite particles were covered with a certain amount or more of silicon oxide, degradation of the cycle performance of the lithium-ion secondary battery was inhibited.

EXPLANATION OF REFERENCE

101: electrode, 102: current collector, 103: active material layer, 111: active material, 112: film, 113: binder, 114: space, 200: negative electrode, 201: negative electrode current collector, 202: negative electrode active material layer, 211: negative electrode active material, 212: film, 213: binder, 215: graphene, 250: positive electrode, 251: positive electrode current collector, 252: positive electrode active material layer, 261: positive electrode active material, 262: film, 263: binder, 265: graphene, 300: lithium-ion battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: lithium-ion battery, 401: positive electrode current collector, 402: positive electrode active material layer, 403: positive electrode, 404: negative electrode current collector, 405: negative electrode active material layer, 406: negative electrode, 407: separator, 408: electrolytic solution, 409: exterior body, 500: lithium-ion battery, 501: positive electrode cap, 502: battery can, 503: positive electrode terminal, 504: positive electrode, 505: separator, 506: negative electrode, 507: negative electrode terminal, 508: insulating plate, 509: insulating plate, 511: PTC element, 512: safety valve mechanism, 600: display device, 601: housing, 602: display portion, 603: speaker portion, 604: power storage device, 610: lighting device, 611: housing, 612: light source, 613: power storage device, 614: ceiling, 615: wall, 616: floor, 617: window, 620: indoor unit, 621: housing, 622: air outlet, 623: power storage device, 624: outdoor unit, 630: electric refrigerator-freezer, 631: housing, 632: door for refrigerator, 633: door for freezer, 634: power storage device, 650: tablet terminal, 651: housing, 652: display portion, 652a: display portion, 652b: display portion, 653: display-mode switching button, 654: power button, 655: power-saving-mode switching button, 656: operation button, 657a: touch panel area, 657b: touch panel area, 658: operation key, 659: keyboard display switching button, 660: solar cell, 670: charge and discharge control circuit, 671: battery, 672: DC-DC converter, 673: converter, 680: electric vehicle, 681: battery, 682: control circuit, 683: driving device, 684: processing unit, 701: curve, 702: curve, 703: curve, 751: graphite particle, and 752: silicon oxide film This application is based on Japanese Patent Application serial no. 2012-245847 filed with Japan Patent Office on Nov. 7, 2012, the entire contents of which are hereby incorporated by reference.

The invention claimed is:

1. A method for forming an electrode for a power storage device, comprising:
    forming a slurry containing a plurality of active material particles and a binder;
    forming an active material layer by applying the slurry to a current collector;
    drying the active material layer;
    soaking the active material layer in a treatment liquid containing a solvent, an organosilicon compound, and a catalyst after drying the active material layer; and
    performing heat treatment on the active material layer, thereby forming silicon oxide covering surfaces of the plurality of active material particles,
    wherein the plurality of active material particles, the binder and the silicon oxide are in contact with one another.

2. The method for forming an electrode for a power storage device, according to claim 1,
    wherein the organosilicon compound comprises at least one of ethyl polysilicate, methyl polysilicate, propyl polysilicate, butyl polysilicate, tetramethoxysilane, tetraethoxysilane, tetrabutoxysilane, and tetrapropoxysilane.

3. The method for forming an electrode for a power storage device, according to claim 1, further comprising the step of evaporating the solvent permeating the active material layer.

4. The method for forming an electrode for a power storage device, according to claim 1,
    wherein the plurality of active material particles comprise a carbon material, and
    wherein an R value of the carbon material is less than 0.4.

5. The method for forming an electrode for a power storage device, according to claim 1,
    wherein the plurality of active material particles comprise a carbon material, and
    wherein an R value of the carbon material is less than 1.1.

6. The method for forming an electrode for a power storage device, according to claim 1, further comprising the step of evaporating the solvent permeating the active material layer,
    wherein the heat treatment is performed after evaporating the solvent.

7. The method for forming an electrode for a power storage device, according to claim 1,
    wherein the heat treatment is performed so that the active material layer reacts with moisture in the air.

8. A method for forming an electrode for a power storage device, comprising:
    forming a slurry containing a plurality of active material particles and a binder;
    forming an active material layer by applying the slurry to a current collector;
    drying the active material layer;
    soaking the active material layer in a treatment liquid containing a solvent, an organometallic compound, and a catalyst after drying the active material layer; and
    performing heat treatment on the active material layer, thereby forming metal oxide covering surfaces of the plurality of active material particles,
    wherein the plurality of active material particles, the binder and the metal oxide are in contact with one another.

9. The method for forming an electrode for a power storage device, according to claim 8,
    wherein the organometallic compound comprises at least one of an organic aluminum compound and an organogallium compound.

10. The method for forming an electrode for a power storage device, according to claim 8, further comprising the step of evaporating the solvent permeating the active material layer.

11. The method for forming an electrode for a power storage device, according to claim 8,
    wherein the plurality of active material particles comprise a carbon material, and
    wherein an R value of the carbon material is less than 0.4.

12. The method for forming an electrode for a power storage device, according to claim 8,
    wherein the plurality of active material particles comprise a carbon material, and
    wherein an R value of the carbon material is less than 1.1.

13. The method for forming an electrode for a power storage device, according to claim 8, further comprising the step of evaporating the solvent permeating the active material layer,
    wherein the heat treatment is performed after evaporating the solvent.

14. The method for forming an electrode for a power storage device, according to claim 8,
    wherein the heat treatment is performed so that the active material layer reacts with moisture in the air.

* * * * *